United States Patent
Tandai et al.

(10) Patent No.: US 10,770,925 B2
(45) Date of Patent: Sep. 8, 2020

(54) ELECTRONIC APPARATUS AND METHOD

(71) Applicant: KABUSHIKI KAISHA TOSHIBA, Minato-ku, Tokyo (JP)

(72) Inventors: Tomoya Tandai, Ota Tokyo (JP); Kentaro Taniguchi, Kawasaki Kanagawa (JP); Toshiya Mitomo, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 16 days.

(21) Appl. No.: 16/299,479

(22) Filed: Mar. 12, 2019

(65) Prior Publication Data

US 2020/0076241 A1 Mar. 5, 2020

(30) Foreign Application Priority Data

Sep. 4, 2018 (JP) .................. 2018-165366

(51) Int. Cl.
*H02J 50/23* (2016.01)
*H02J 50/40* (2016.01)
*H02J 50/80* (2016.01)

(52) U.S. Cl.
CPC .............. *H02J 50/23* (2016.02); *H02J 50/40* (2016.02); *H02J 50/80* (2016.02)

(58) Field of Classification Search
CPC .. H02J 50/20; H02J 50/23; H02J 50/40; H02J 50/80
See application file for complete search history.

(56) References Cited

U.S. PATENT DOCUMENTS

| 9,876,353 B2 * | 1/2018 | Eckert ................ B60L 53/14 |
| 2012/0149307 A1* | 6/2012 | Terada ................ H02J 7/025 455/66.1 |
| 2013/0062959 A1 | 3/2013 | Lee et al. |

(Continued)

FOREIGN PATENT DOCUMENTS

| JP | 2014533481 A | 12/2014 |
| JP | 2020031459 | 2/2020 |

OTHER PUBLICATIONS

The Institute of Electrical and Electronics Engineers, Inc., "IEEE Std 802.11TM-2016 (Revision of IEEE Std 802.11-2012)—IEEE Standard for Information technology—Telecommunications and information exchange between systems Local and metropolitan area networks—Specific requirements—Part 11: Wireless LAN Medium Access Control (MAC) and Physical Layer (PHY) Specifications," Dec. 14, 2016, pp. 1-3532.

(Continued)

*Primary Examiner* — Levi Gannon
(74) *Attorney, Agent, or Firm* — Holtz, Holtz & Volek PC

(57) ABSTRACT

According to one embodiment, an electronic apparatus includes a power transmitter, detect circuitry and control circuitry. The power transmitter is configured to transmit a power by an electromagnetic wave of a power transmission frequency band according to a power transmission period. The detect circuitry is configured to detect a power in a frequency band different from the power transmission frequency band. The control circuitry is configured to determine the power transmission period based on a first threshold value, a second threshold value, a third threshold value and a fourth threshold value.

17 Claims, 12 Drawing Sheets

(56) References Cited

U.S. PATENT DOCUMENTS

| | | | |
|---|---|---|---|
| 2014/0159647 A1* | 6/2014 | Nishioka | H02J 7/02 |
| | | | 320/107 |
| 2015/0208328 A1* | 7/2015 | Drugge | H04L 27/2686 |
| | | | 455/434 |
| 2017/0188294 A1* | 6/2017 | Xu | H04W 48/16 |
| 2020/0057474 A1 | 2/2020 | Pabbisetty et al. | |

OTHER PUBLICATIONS

U.S. Appl. No. 16/294,105, Title: "Electronic Apparatus, Measurement Apparatus, and Method," filed Mar. 6, 2019, First Named Inventor: Gurusanthosh Pabbisetty.

* cited by examiner

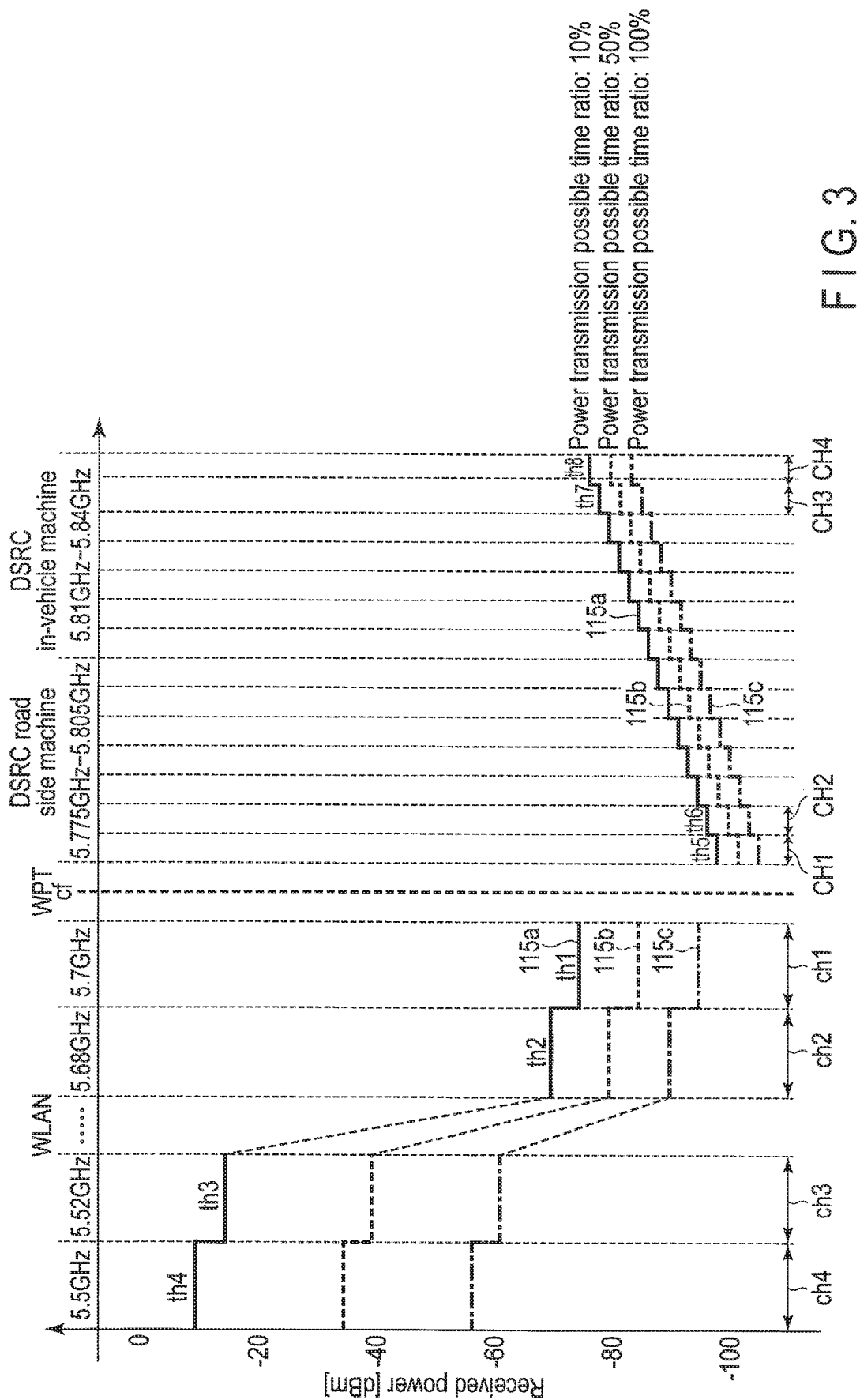
F I G. 3

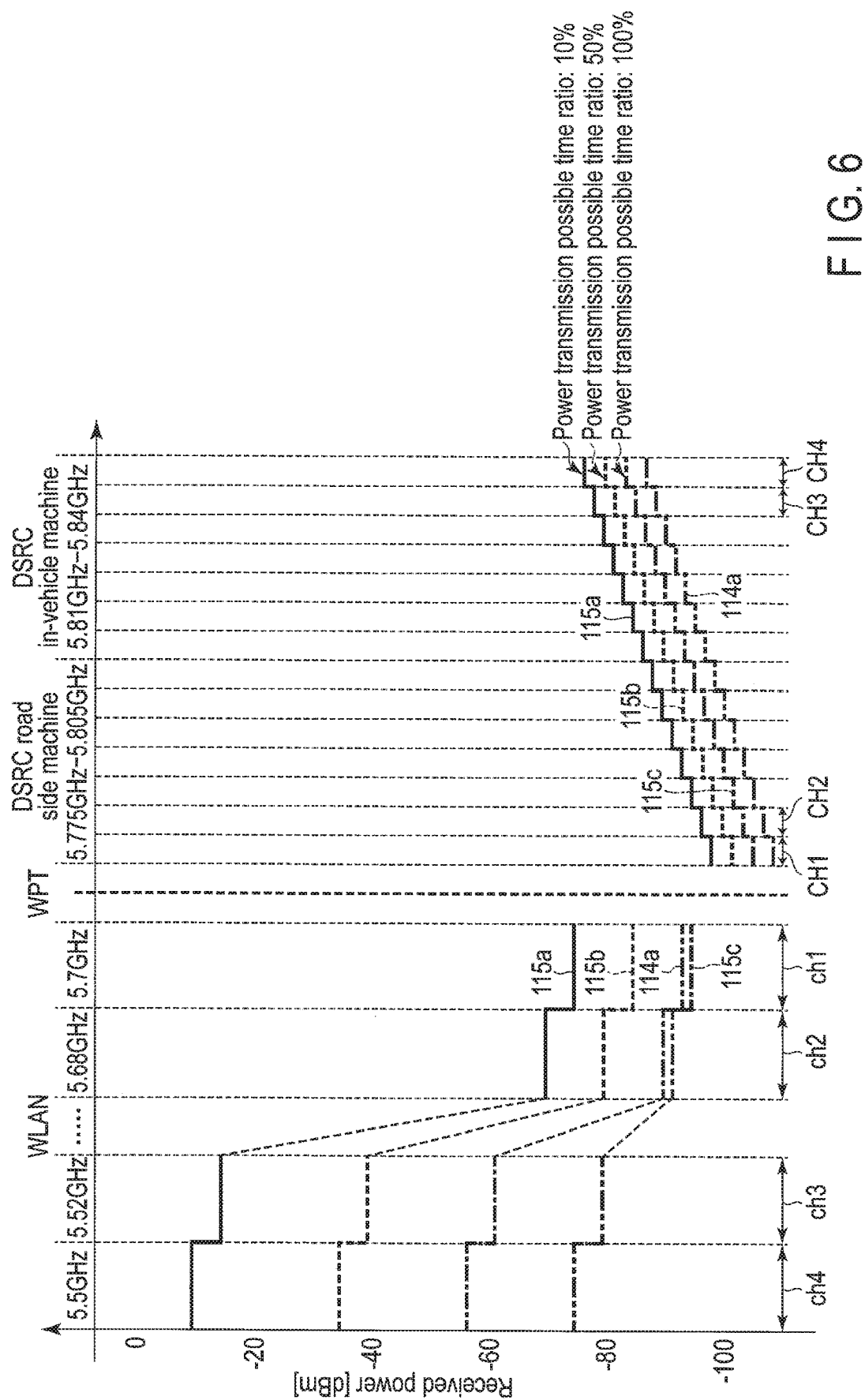
F I G. 6

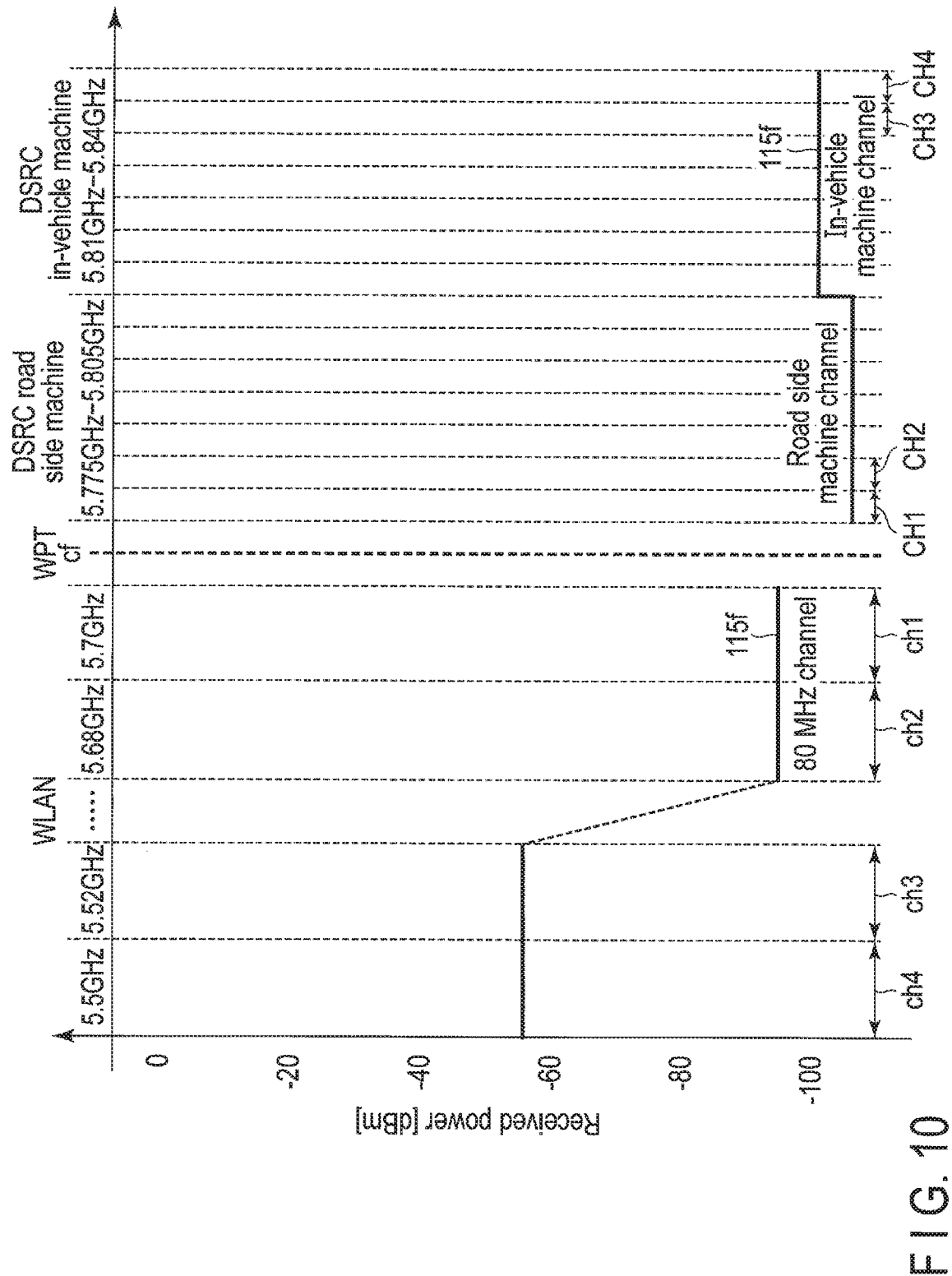
F I G. 10

ELECTRONIC APPARATUS AND METHOD

CROSS-REFERENCE TO RELATED APPLICATIONS

This application is based upon and claims the benefit of priority from Japanese Patent Application No. 2018-165366, filed Sep. 4, 2018, the entire contents of which are incorporated herein by reference.

FIELD

Embodiments described herein relate generally to an electronic apparatus and a method.

BACKGROUND

Generally, in wireless power transmission in which power transmission is performed using an electromagnetic wave, the power transmission is performed using an electromagnetic wave having a specific frequency, such that there is a risk of interference with other wireless communication systems using frequencies near the specific frequency.

For this reason, it has been demanded to develop a technology capable of performing wireless power transmission without generating serious interference with other wireless communication systems.

BRIEF DESCRIPTION OF THE DRAWINGS

FIG. 3 is a view for describing first information according to the embodiment.

FIG. 6 is another view for complementarily describing the operations of the wireless power transmission apparatus according to the embodiment.

FIG. 10 is yet another view for describing the first information according to the embodiment.

DETAILED DESCRIPTION

Figure 1:
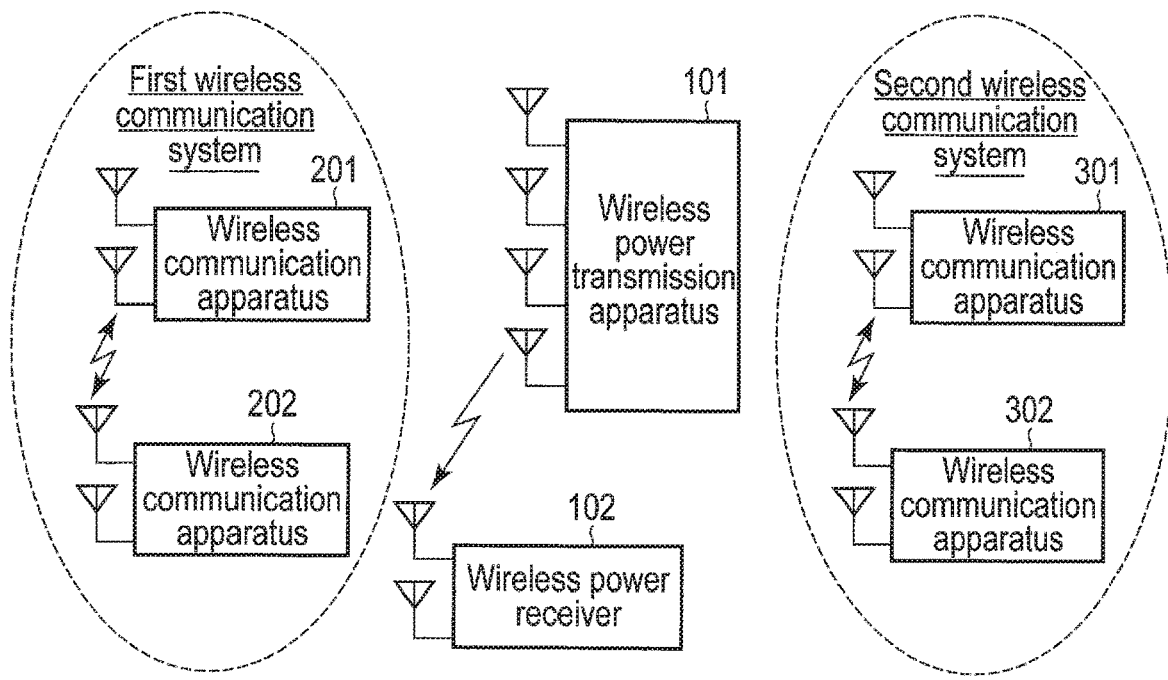
FIG. 1 is a view illustrating an example of a wireless power transmission environment according to an embodiment.

In general, according to one embodiment, an electronic apparatus includes a power transmitter, detect circuitry and control circuitry. The power transmitter is configured to transmit a power by an electromagnetic wave of a power transmission frequency band according to a power transmission period. The detect circuitry is configured to detect a power in a frequency band different from the power transmission frequency band. The control circuitry is configured to determine the power transmission period based on a first threshold value set for a power detected in a first frequency band, a second threshold value set for a power detected in a second frequency band, a third threshold value set for a power detected in a third frequency band, and a fourth threshold value set for a power detected in a fourth frequency band. The first frequency band includes a lower frequency than a center frequency of the power transmission frequency band. The second frequency band includes a higher frequency than the center frequency. The third frequency band is adjacent to the first frequency band and includes a lower frequency than the first frequency band. The fourth frequency band is adjacent to the second frequency band and includes a higher frequency than the second frequency band. The third threshold value is larger than the first threshold value. The fourth threshold value is larger than the second threshold value. A difference between the third threshold value and the first threshold value is larger than that between the fourth threshold value and the second threshold value.

Hereinafter, embodiments will be described with reference to the drawings. The disclosure is only an example, and the present invention is not limited by contents described in the following embodiments. Modifications easily conceivable by those skilled in the art are naturally included in the scope of the disclosure. In order to make a description clearer, in the drawings, sizes, shapes and the like of the respective portions may be modified and schematically illustrated with respect to an actual embodiment. In a plurality of drawings, corresponding components are denoted by the same reference numerals, and a detailed description thereof may be omitted.

FIG. 1 illustrates an example of a wireless power transmission environment including a wireless power transmission system according to an embodiment. The wireless power transmission environment illustrated in FIG. 1 includes a wireless power transmission system including a wireless power transmission apparatus 101 and a wireless power receiver 102, a first wireless communication system including at least two wireless communication apparatuses 201 and 202, and a second wireless communication system being a system performing wireless communication using a frequency band different from that of the first wireless communication system and including at least two wireless communication apparatuses 301 and 302.

A case where the wireless power transmission system includes one wireless power receiver 102 is illustrated in FIG. 1, but the present invention is not limited thereto, and the wireless power transmission system may also include a plurality of wireless power receiver 102.

The wireless power transmission apparatus 101 transmits a power to the wireless power receiver 102 using an electromagnetic wave of a predetermined frequency band. The first wireless communication system is a system performing wireless communication using a frequency band positioned on a lower frequency side than a frequency band used by the wireless power transmission apparatus 101 at the time of power transmission. For example, a wireless local area network (LAN) system according to the Institute of Electrical and Electronics Engineers (IEEE) 802.11 standard or the like, corresponds to the first wireless communication system. On the other hand, the second wireless communication system is a system performing wireless communication using a frequency band positioned on a higher frequency side than a frequency band used by the wireless power transmission apparatus 101 at the time of power transmission. For example, a dedicated short range communications (DSRC) system corresponds to the second wireless communication system.

In the present embodiment, it is assumed that the wireless power transmission system uses a frequency in a frequency band of 5.7 GHz to 5.8 GHz at the time of power transmission. In the present embodiment, it is assumed that the first wireless communication system uses a frequency in a frequency band of 5.5 GHz to 5.7 GHz at the time of wireless communication. In the present embodiment, it is assumed that the second wireless communication system uses a frequency in a frequency band of 5.775 GHz to 5.805 GHz or a frequency in a frequency band of 5.81 GHz to 5.84 GHz at the time of wireless communication. However, the frequency bands used by the respective systems are not limited to the frequency bands described above, and the respective systems may perform wireless power transmission or wireless communication using arbitrary frequency bands.

As illustrated in FIG. 1, when the first wireless communication system or the second wireless communication system exists in the vicinity of the wireless power transmission system, it is likely that an electromagnetic wave transmitted (radiated) from the wireless power transmission apparatus 101 to the wireless power receiver 102 in order to transmit the power will interfere with wireless signals transmitted and received in the first and second wireless communication systems. Therefore, it is likely that transmission and reception of wireless signals cannot be normally performed in the first and second wireless communication systems.

For this reason, in the present embodiment, the wireless power transmission apparatus 101 capable of performing wireless power transmission to the wireless power receiver 102 without generating serious interference with the first wireless communication system and the second wireless communication system will be described.

Figure 2:
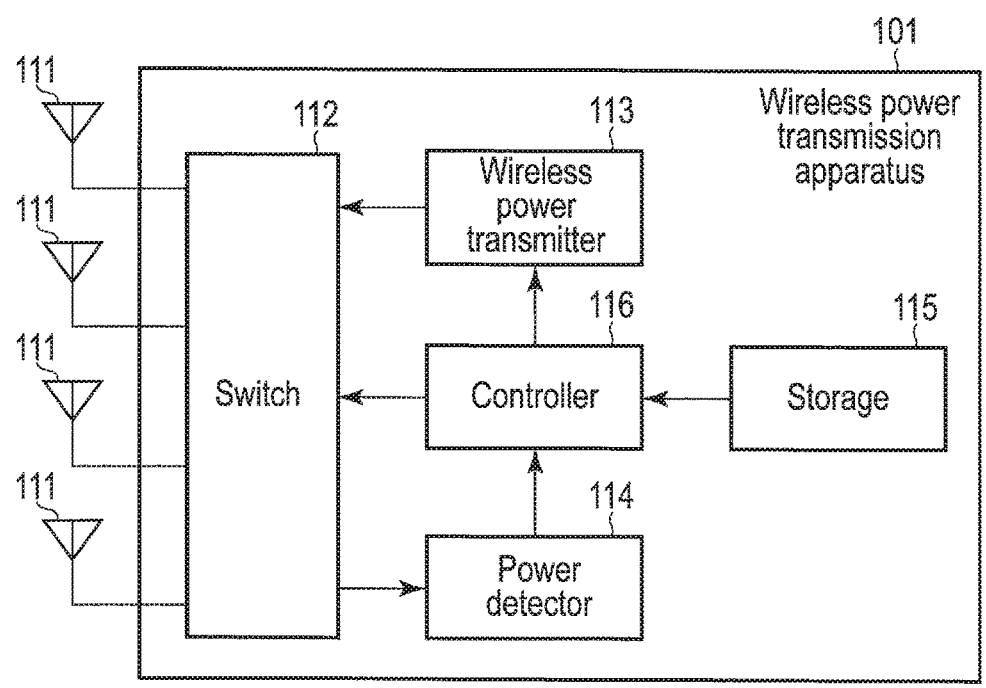
FIG. 2 is a view illustrating an example of a hardware configuration of a wireless power transmission apparatus according to the embodiment.

FIG. 2 illustrates an example of a hardware configuration of the wireless power transmission apparatus 101.

The wireless power transmission apparatus 101 includes one or more antennas 111, a switch 112, a wireless power transmitter (WPT) 113, a power detector 114 (detect circuitry), a storage 115, a controller 116 (control circuitry) and the like, as illustrated in FIG. 2. In FIG. 2, it is assumed that the wireless power transmitter 113, the power detector 114, and the controller 116 are realized by one chip, but the present invention is not limited thereto, and some or all of the wireless power transmitter 113, the power detector 114, and the controller 116 may be realized by separate chips.

The antenna 111 can switch an operation mode according to an instruction from the switch 112, and functions as a receiving antenna or a transmitting antenna. In a case where the antenna 111 functions as the receiving antenna, the antenna 111 receives (detects) wireless signals transmitted and received in the first and second wireless communication systems with which interference can be generated. On the other hand, in a case where the antenna 111 functions as the transmitting antenna, the antenna 111 radiates an electromagnetic wave to the wireless power receiver 102 in order to perform wireless power transmission.

The switch 112 switches the operation mode of the antenna 111 according to an instruction from the controller 116. That is, the switch 112 switches whether to cause the antenna 111 to function as the receiving antenna or as the transmitting antenna.

Here, a case where the antenna 111 functions as the transmitting antenna or the receiving antenna according to the instruction from the switch 112 has been described, but the present invention is not limited thereto, and a receiving antenna and a transmitting antenna may be separately provided in the wireless power transmission apparatus 101.

The wireless power transmitter 113 supplies a power transmission signal to the antenna 111 according to an instruction from the controller 116, and performs wireless power transmission. When the power transmission signal is supplied to the antenna 111, the antenna 111 generates an electromagnetic wave that is to be radiated to the wireless power receiver 102. After that, the antenna 111 radiates the generated electromagnetic wave to the wireless power receiver 102 with a predetermined transmitting power (power of an electromagnetic wave).

The power detector 114 detects a power (received power) of the wireless signal received by the antenna 111 when the antenna 111 functions as the receiving antenna. It should be noted that the wireless signal is received for each frequency band used by the first and second wireless communication systems. That is, the power detector 114 detects received powers for each frequency band used by the first and second wireless communication systems. The antenna 111 is switched to an operation mode in which it functions as the receiving antenna for each predetermined interval in order to detect the received power by the power detector 114.

Information on the wireless power transmission by the wireless power transmission apparatus 101 is pre-stored in the storage 115. Specifically, first information associating threshold values each set for received powers detected for each of a plurality of frequency bands used by the first and second wireless communication systems and information on a time during which an electromagnetic wave can be radiated to the wireless power receiver 102 with each other is pre-stored in the storage 115.

The information on the time during which the electromagnetic wave can be radiated to the wireless power receiver 102 refers to a percentage of a time (hereinafter, referred to as a "power transmission possible time") during which the electromagnetic wave can be actually radiated to the wireless power receiver 102 to a maximum value (hereinafter, referred to as a "maximum power transmission time") of a time during which the electromagnetic wave can be radiated to the wireless power receiver 102 with a predetermined transmitting power. Hereinafter, the percentage of the power transmission possible time to the maximum power transmission time is referred to as a "power transmission possible time ratio".

It should be noted that the maximum power transmission time is determined depending on negotiation performed in order to establish communication between the wireless power transmission apparatus 101 and the wireless power receiver 102.

That is, the maximum power transmission time is dynamically changed depending on power transmission setting determined at the time of the negotiation. The negotiation performed between the wireless power transmission apparatus 101 and the wireless power receiver 102 is performed using, for example, Bluetooth (registered trademark) provided in each of the wireless power transmission apparatus 101 and the wireless power receiver 102.

The controller 116 determines the power transmission possible time ratio based on each received power detected for each frequency band by the power detector 114 and the first information pre-stored in the storage 115. The controller 116 controls a timing (hereinafter, referred to as a "power transmission timing") at which the wireless power transmitter 113 supplies the power transmission signal to the antenna 111. More specifically, the controller 116 determines the power transmission timing depending on the determined power transmission possible time ratio. After that, the controller 116 supplies an instruction signal for instructing the wireless power transmitter 113 to supply the power transmission signal to the antenna 111 at the determined power transmission timing to the wireless power transmitter 113. In addition, the controller 116 controls the switch 112, the wireless power transmitter 113, and the power detector 114.

The power transmission possible time ratio indicates only a ratio of the power transmission possible time to the maximum power transmission time, as described above, and does not define a power transmission method. Therefore, for example, when the maximum power transmission time is 10 seconds and the power transmission possible time ratio is 50%, the controller 116 may control the wireless power transmitter 113 to perform wireless power transmission in such a manner as to perform the wireless power transmission for 5 seconds and stop the wireless power transmission for 5 seconds or may control the wireless power transmitter 113 to perform wireless power transmission in such a manner as to repeatedly execute a routine of performing the wireless power transmission for 1 second and stopping the wireless power transmission for 1 second.

Next, the first information pre-stored in the storage 115 will be described in detail with reference to FIG. 3.

FIG. 3 illustrates a plurality of reference lines 115a to 115c indicated by a plurality of pieces of first information pre-stored in the storage 115. The first information is information associating the threshold values related to the received powers set for each frequency band used in the first and second wireless communication systems and the percentage (the power transmission possible time ratio) of the power transmission possible time to the maximum power transmission time with each other, as described above. The first information is represented as the reference lines 115a to 115c as illustrated in FIG. 3 by connecting the threshold values related to the received powers set for each frequency band to each other for each power transmission possible time ratio.

A first reference line 115a represented by a solid line in FIG. 3 shows threshold values for each frequency band corresponding to a case where the time (the power transmission possible time) during which the electromagnetic wave can be radiated to the wireless power receiver 102 with a predetermined transmitting power without generating serious interference with the first and second wireless communication systems is 10% of the maximum power transmission time. Likewise, a second reference line 115b represented by a dotted line in FIG. 3 shows threshold values for each frequency band corresponding to a case where the time during which the electromagnetic wave can be radiated to the wireless power receiver 102 with a predetermined transmitting power without generating serious interference with the first and second wireless communication systems is 50% of the maximum power transmission time. Further, a third reference line 115c represented by an alternate long and short dash line in FIG. 3 shows threshold values for each frequency band corresponding to a case where the time during which the electromagnetic wave can be radiated to the wireless power receiver 102 with a predetermined transmitting power without generating serious interference with the first and second wireless communication systems is 100% of the maximum power transmission time. Here, a description will be provided on the assumption that the transmitting power at the time of radiating the electromagnetic wave is constant.

The threshold values related to the received powers set for each frequency band used in the first and second wireless communication systems are set based on a center frequency cf of a frequency band (hereinafter, referred to as a "power transmission frequency band") used by the wireless power transmission apparatus 101 at the time of the power transmission.

First, a relationship among the respective reference lines 115a to 115c will be described.

The threshold values related to the received powers set for each frequency band used in the first and second wireless communication systems are set to become larger as the power transmission possible time ratio becomes smaller and are set to become smaller as the power transmission possible time ratio becomes larger, as shown by the first to third reference lines 115a to 115c of FIG. 3.

For example, when focusing on a frequency band ch1 positioned adjacent to a lower frequency side than the center frequency cf of the power transmission frequency band described above (that is, focusing on one of the frequency bands used in the first wireless communication system), a threshold value shown by the second reference line 115b with the power transmission possible time ratio of 50% is set to be smaller than that shown by the first reference line 115a with the power transmission possible time ratio of 10%, and a threshold value shown by the third reference line 115c with the power transmission possible time ratio of 100% is set to be smaller than that shown by the second reference line 115b.

Here, a description has been provided focusing on the frequency band ch1 as one of the frequency bands positioned adjacent to the lower frequency side than the center frequency cf of the power transmission frequency band, but also in other frequency bands positioned on the lower frequency side than the center frequency cf, threshold values are set to become smaller as the power transmission possible time ratio becomes larger and are set to become larger as the power transmission possible time ratio becomes smaller.

In addition, when focusing on a frequency band CH1 positioned adjacent to a higher frequency side than the center frequency cf of the power transmission frequency band described above (that is, focusing on one of the frequency bands used in the second wireless communication system), as in the frequency band ch1 described above, a threshold value shown by the second reference line 115b with the power transmission possible time ratio of 50% is set to be smaller than that shown by the first reference line 115a with the power transmission possible time ratio of 10%, and a threshold value shown by the third reference line 115c with the power transmission possible time ratio of 100% is set to be smaller than that shown by the second reference line 115b.

Here, a description has been provided focusing on the frequency band CH1 as one of the frequency bands positioned adjacent to the higher frequency side than the center frequency cf of the power transmission frequency band, but also in other frequency bands positioned on the higher frequency side than the center frequency cf, threshold values are set to become smaller as the power transmission possible time ratio becomes larger and are set to become larger as the power transmission possible time ratio becomes smaller.

Next, a relationship between the frequency band and the threshold value will be described with reference to the first reference line 115a as an example.

As shown by the first reference line 115a of FIG. 3, in the frequency band ch1 positioned adjacent to the lower frequency side than the center frequency cf of the power transmission frequency band, a first threshold value th1 is set as the threshold value related to the received power. In FIG. 3, the frequency band ch1 corresponds to a first frequency band and the first threshold value th1 corresponds to a first threshold value in claims. In addition, in a frequency band ch2 positioned adjacent to a lower frequency side than the frequency band ch1 described above, a second threshold value th2 larger than the first threshold value th1 is set as the threshold value related to the received power. Likewise, in a frequency band ch3 positioned on a lower frequency side than the frequency band ch2 described above, a third threshold value th3 larger than the second threshold value th2 is set, and in a frequency band ch4 positioned on a lower frequency side than the frequency band ch3 described above, a fourth threshold value th4 larger than the third threshold value th3 is set. In FIG. 3, the frequency bands ch2 to ch4 correspond to a third frequency band and the threshold values th2 to th4 correspond to a third threshold value in claims.

That is, in each frequency band positioned on the lower frequency side than the center frequency cf of the power transmission frequency band, threshold values related to received powers are set so that a shape of the reference line is an ascending stair shape starting from the frequency band ch1 positioned adjacent to the center frequency cf. This is because as the frequency band becomes more distant from the center frequency cf of the power transmission frequency band, it is less subjected to interference from the wireless power transmission apparatus 101 and there is no problem even though the threshold value related to the received power is set to become larger.

In FIG. 3, illustration of frequency bands positioned between the frequency band ch2 and the frequency band ch3 is omitted for convenience of explanation, but it is assumed that threshold values are set by the same rule also in the frequency bands positioned between the frequency band ch2 and the frequency band ch3. That is, in one or more frequency bands positioned between the frequency band ch2 and the frequency band ch3, threshold values larger than the second threshold value th2 and smaller than the third threshold value th3 are set.

In addition, as shown by the first reference line 115a of FIG. 3, in the frequency band CH1 positioned adjacent to the higher frequency side than the center frequency cf of the power transmission frequency band, a fifth threshold value th5 is set as the threshold value related to the received power. In FIG. 3, the frequency band CH1 corresponds to a second frequency band and the fifth threshold value th5 corresponds to a second threshold value in claims. In a frequency band CH2 positioned adjacent to a higher frequency side than the frequency band CH1 described above, a sixth threshold value th6 larger than the fifth threshold value th5 is set as the threshold value related to the received power. Likewise, in a frequency band CH3 positioned on a higher frequency side than the frequency band CH2 described above, a seventh threshold value th7 larger than the sixth threshold value th6 is set, and in a frequency band CH4 positioned on a higher frequency side than the frequency band CH3 described above, an eighth threshold value th8 larger than the seventh threshold value th7 is set. In FIG. 3, the frequency bands CH2 to CH4 correspond to a fourth frequency band and the threshold values th6 to th8 correspond to a fourth threshold value in claims.

That is, in each frequency band positioned on the higher frequency side than the center frequency cf of the power transmission frequency band, threshold values related to received powers are set so that a shape of the reference line is an ascending stair shape starting from the frequency band CH1 positioned adjacent to the center frequency cf. This is because as the frequency band becomes more distant from the center frequency cf of the power transmission frequency band, it is less subjected to interference from the wireless power transmission apparatus 101 and there is no problem even though the threshold value related to the received power is set to become larger.

Here, a description of frequency bands positioned between the frequency band CH2 and the frequency band CH3 is omitted for convenience of explanation, but it is assumed that threshold values are set by the same rule also in the frequency bands positioned between the frequency band CH2 and the frequency band CH3. That is, in one or more frequency bands positioned between the frequency band CH2 and the frequency band CH3, threshold values larger than the sixth threshold value th6 and smaller than the seventh threshold value th7 are set.

In addition, here, a description has been provided with reference to the first reference line 115a as an example, but threshold values related to received powers are set for each frequency band by the same rule also with respect to the second and third reference lines 115b and 115c.

Next, a relationship between the threshold value set on the lower frequency side (that is, the frequency band used in the first wireless communication system) than the center frequency cf of the power transmission frequency band and the threshold value set on the higher frequency side (that is, the frequency band used in the second wireless communication system) than the center frequency cf will be described with reference to the first reference line 115a as an example.

As described above, the first threshold value th1 is set in the frequency band ch1 positioned adjacent to the lower frequency side than the center frequency cf of the power transmission frequency band, and the fifth threshold value th5 is set in the frequency band CH1 positioned adjacent to the higher frequency side than the center frequency cf. As shown by the first reference line 115a of FIG. 3, the first threshold value th1 set in the frequency band ch1 on the lower frequency side is set to be larger than the fifth threshold value th5 set in the frequency band CH1 on the higher frequency side.

Likewise, the second threshold value th2 set in the frequency band ch2 positioned adjacent to the lower frequency side than the frequency band ch1 is set to be larger than the sixth threshold value th6 set in the frequency band CH2 positioned adjacent to the higher frequency side than the frequency band CH1. That is, a threshold value is set to be larger in a predetermined frequency band on the lower frequency side than in a frequency band on the higher frequency side corresponding to the predetermined frequency band.

In addition, the respective threshold values are set so that a difference (that is, a difference between the first threshold value th1 and the second threshold value th2) between the threshold values set in the frequency bands ch1 and ch2 adjacent to each other on the lower frequency side than the center frequency cf of the power transmission frequency band is larger than a difference (that is, a difference between the fifth threshold value th5 and the sixth threshold value th6) between the threshold values set in the frequency bands CH1 and CH2 adjacent to each other on the higher frequency side than the center frequency cf.

That is, the threshold values related to the received powers are set so that a shape of the reference line is an asymmetric shape between the lower frequency side and the higher frequency side with respect to the center frequency cf of the power transmission frequency band. This is because transmission specifications or reception quality requirements are different between the first wireless communication system and the second wireless communication system.

Specifically, since the first wireless communication system is the wireless LAN system and a target transmitted and received between the wireless communication apparatuses 201 and 202 of the first wireless communication system is, for example, an e-mail or the like, even though transmission and reception of the e-mail fail due to interference from the wireless power transmission apparatus 101, it is unlikely that a serious problem will occur. On the other hand, since the second wireless communication system is the wireless DSRC system and a target transmitted and received between the wireless communication apparatuses 301 and 302 of the second wireless communication system is, for example, charging information, when transmission and reception of the charging information fail due to interference from the wireless power transmission apparatus 101, it is more likely that a serious problem will occur as compared with the failure of the transmission and the reception of the e-mail as described above. For this reason, the threshold values related to the received powers are set to be lower on the second wireless communication system side (that is, on the higher frequency side than center frequency cf of the power transmission frequency band), than on the first wireless communication system side (that is, on the lower frequency side than center frequency cf of the power transmission frequency band), such that when even a slightly large power is detected by the power detector 114, the power transmission possible time ratio is set to be low.

The first information having various relationships described above is generated, and the generated first information is pre-stored in the storage 115 of the wireless power transmission apparatus 101.

Here, a case in which each of the first to third reference lines 115a to 115c defines one power transmission possible time ratio (in other words, defines a common value between the lower frequency side and the higher frequency side) has been described, but the present invention is not limited thereto. For example, different power transmission possible time ratios may also be defined between the lower frequency side and the higher frequency side than the center frequency cf of the power transmission frequency band. Specifically, a power transmission possible time ratio of 20% may be defined on the lower frequency side of the first reference line 115a, and a power transmission possible time ratio of 10% may be defined on the higher frequency side of the first reference line 115a.

Here, an example of operations of the wireless power transmission apparatus 101 will be described with reference to a flowchart of FIG. 4. It is assumed that the first information drawing the reference lines 115a to 115c illustrated in FIG. 3 is pre-stored in the storage 115 of the wireless power transmission apparatus 101.

The power detector 114 of the wireless power transmission apparatus 101 detects the received powers for each frequency band used in the first and second wireless communication systems for each predetermined period (scan period).

More specifically, first, the switch 112 of the wireless power transmission apparatus 101 switches an operation mode of the antenna 111 to an operation mode in which the antenna 111 functions as the receiving antenna according to an instruction from the controller 116 for each predetermined interval. The antenna 111 receives a wireless signal transmitted and received between the wireless communication apparatuses 201 and 202 for each frequency band used in the first wireless communication system. Likewise, the antenna 111 receives a wireless signal transmitted and received between the wireless communication apparatuses 301 and 302 for each frequency band used in the second wireless communication system (block B1). Then, the power detector 114 detects powers (received powers) of the wireless signals received for each frequency band used in the first and second wireless communication systems (block B2).

Then, the wireless power transmission apparatus 101 performs negotiation with the wireless power receiver 102 using the Bluetooth, and determines the maximum power transmission time depending on the negotiation (block B3). It should be noted that this processing may also be executed before the processing of blocks B1 and B2 described above.

The controller 116 determines the power transmission possible time ratio based on each received power detected for each frequency band by the power detector 114 and the first information pre-stored in the storage 115 (block B4).

Figure 5:
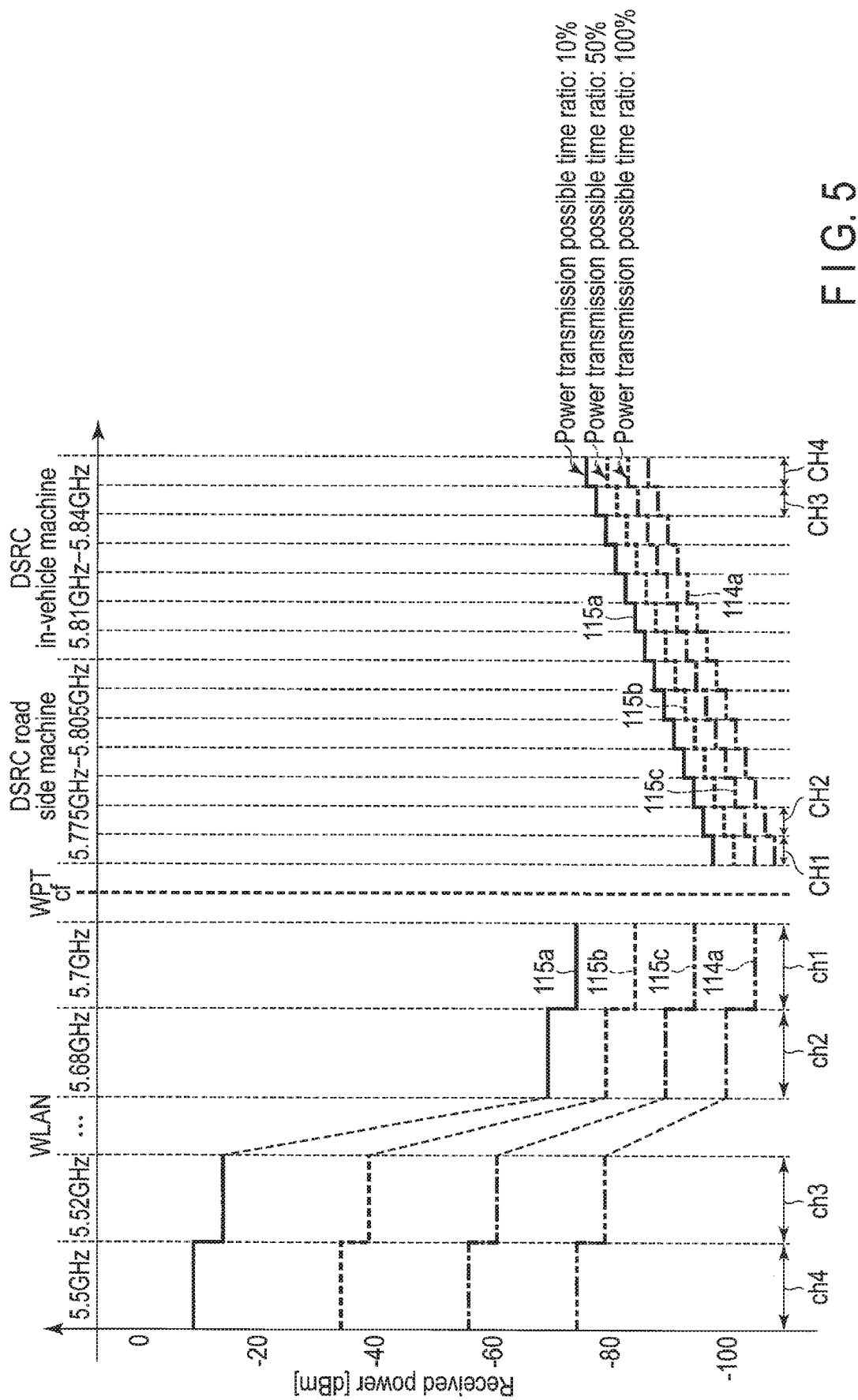
FIG. 5 is a view for complementarily describing the operations of the wireless power transmission apparatus according to the embodiment.
Figure 7:
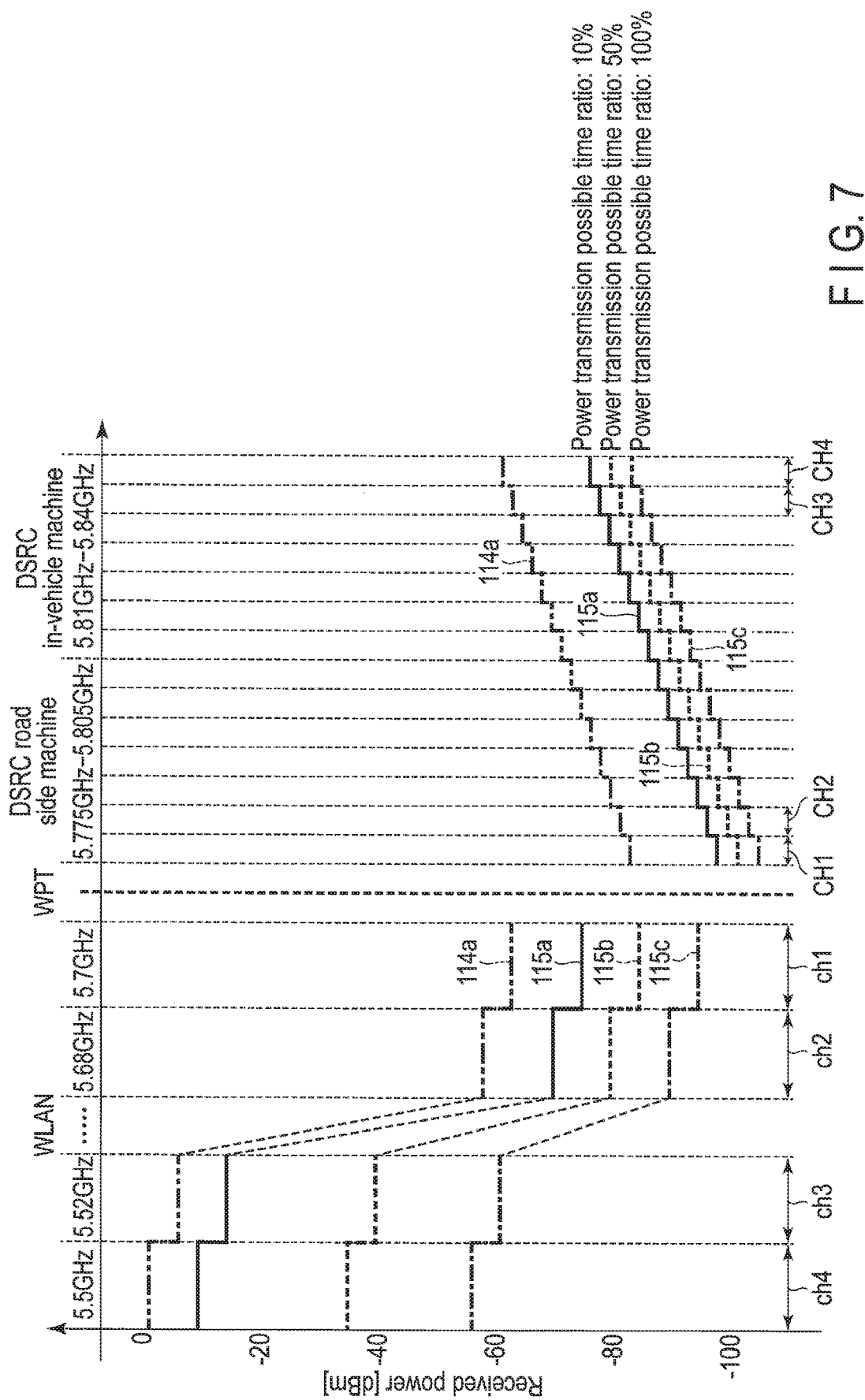
FIG. 7 is yet another view for complementarily describing the operations of the wireless power transmission apparatus according to the embodiment.

Here, processing of block B4 will be described in detail with reference to FIGS. 5 to 7. FIGS. 5 to 7 illustrate the first to third reference lines 115a to 115c shown in FIG. 3 and a detection line 114a obtained by connecting the respective received powers detected for each frequency band by the power detector 114 to each other. As described above, the first reference line 115a represented by a solid line is a reference line with the power transmission possible time ratio of 10%, the second reference line 115b represented by a dotted line is a reference line with the power transmission possible time ratio of 50%, and the third reference line 115c represented by an alternate long and short dash line is a reference line with the power transmission possible time ratio of 100%. In addition, the detection line 114a is represented by an alternate long and two short dashes line.

First, a case of FIG. 5 will be described. In the case of FIG. 5, the detection line 114a is positioned below the third reference line 115c in all the frequency bands. That is, received powers detected for each frequency band by the power detector 114 are smaller than threshold values of the third reference line 115c in all the frequency bands. In this case, the controller 116 decides that it is unlikely that interference with the first and second wireless communication systems will be generated even though wireless power transmission is performed, and determines that the power transmission possible time ratio is 100%.

Next, a case of FIG. 6 will be described. In the case of FIG. 6, the detection line 114a is positioned between the second reference line 115b and the third reference line 115c only in the frequency band ch1, and is positioned below the third reference line 115c in the other frequency bands. That is, among received powers detected for each frequency band by the power detector 114, only a received power detected in the frequency band ch1 is equal to or larger than a threshold value of the third reference line 115c and smaller than a threshold value of the second reference line 115b, and all of the received powers detected in the other frequency bands are smaller than threshold values of the third reference line 115c. In this case, the controller 116 decides that it is unlikely that interference will be generated in frequency bands other than the frequency band ch1 but it is likely that interference with the first wireless communication system that uses the frequency band ch1 will be generated when the power transmission possible time ratio is set to 100%, and determines that the power transmission possible time ratio is 50%.

That is, the controller 116 selects a reference line (that is, the third reference line 115c in the case of FIG. 5 and the second reference line 115b in the case of FIG. 6) which is below the detection line 114a in all the frequency bands, and determines that a power transmission possible time ratio corresponding to the selected reference line is a power transmission possible time ratio at the time of wireless power transmission.

Further, a case of FIG. 7 will be described. In the case of FIG. 7, the detection line 114a is positioned above the first reference line 115a in all the frequency bands. That is, received powers detected for each frequency band by the power detector 114 are equal to or larger than threshold values of the first reference line 115a in all the frequency bands. In this case, the controller 116 decides that it is likely that interference with the first and second wireless communication systems will be generated no matter how small the power transmission possible time ratio is, and determines that wireless power transmission to the wireless power receiver 102 is not performed, that is, that the power transmission possible time ratio is 0%.

Figure 4:
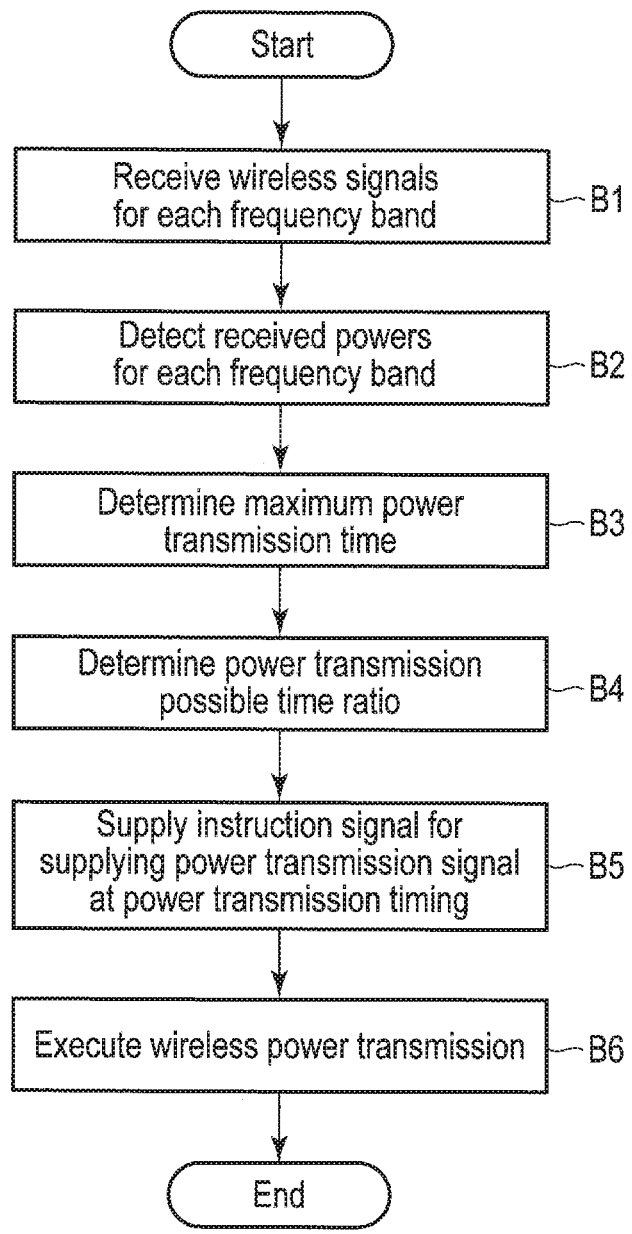
FIG. 4 is a flowchart illustrating an example of operations of the wireless power transmission apparatus according to the embodiment.

A description will again be provided with reference to FIG. 4.

When the power transmission possible time ratio is determined by the processing of the block B4 described above, the controller 116 determines a power transmission timing depending on the determined power transmission possible time ratio, and supplies an instruction signal for instructing the wireless power transmitter 113 to supply a power transmission signal to the antenna 111 at the determined power transmission timing to the wireless power transmitter 113 (Block B5). When an operation mode of the antenna 111 is an operation mode in which the antenna 111 functions as the receiving antenna, the controller 116 supplies an instruction signal for instructing the switch 112 to switch the operation mode of the antenna 111 to an operation mode in which the antenna 111 functions as the transmitting antenna to the switch 112. Therefore, the operation mode of the antenna 111 is switched to the operation mode in which the antenna 111 functions as the transmitting antenna.

Then, the wireless power transmitter 113 supplies the power transmission signal to the antenna 111 according to the instruction signal supplied from the controller 116. As the power transmission signal is supplied from the wireless power transmitter 113, the antenna 111 generates an electromagnetic wave that is to be radiated to the wireless power receiver 102, and radiates the generated electromagnetic wave to the wireless power receiver 102 with a predetermined transmitting power to perform wireless power transmission (Block B6).

According to the embodiment described above, the power detector 114 detects the received powers for each frequency band used by the first and second wireless communication systems for each predetermined period (scan period). In addition, the storage 115 pre-stores the first information having the various relationships described above. Further, the controller 116 determines the power transmission possible time ratio in which the wireless power transmission can be performed without generating serious interference with the first and second wireless communication systems, based on each received power detected by the power detector 114 and the first information pre-stored in the storage 115. Therefore, it is possible to provide the wireless power transmission apparatus 101 capable of performing the wireless power transmission without generating the serious interference with the first and second wireless communication systems.

Hereinafter, a modified example of the present embodiment will be described.

Modified Example 1

Figure 8:
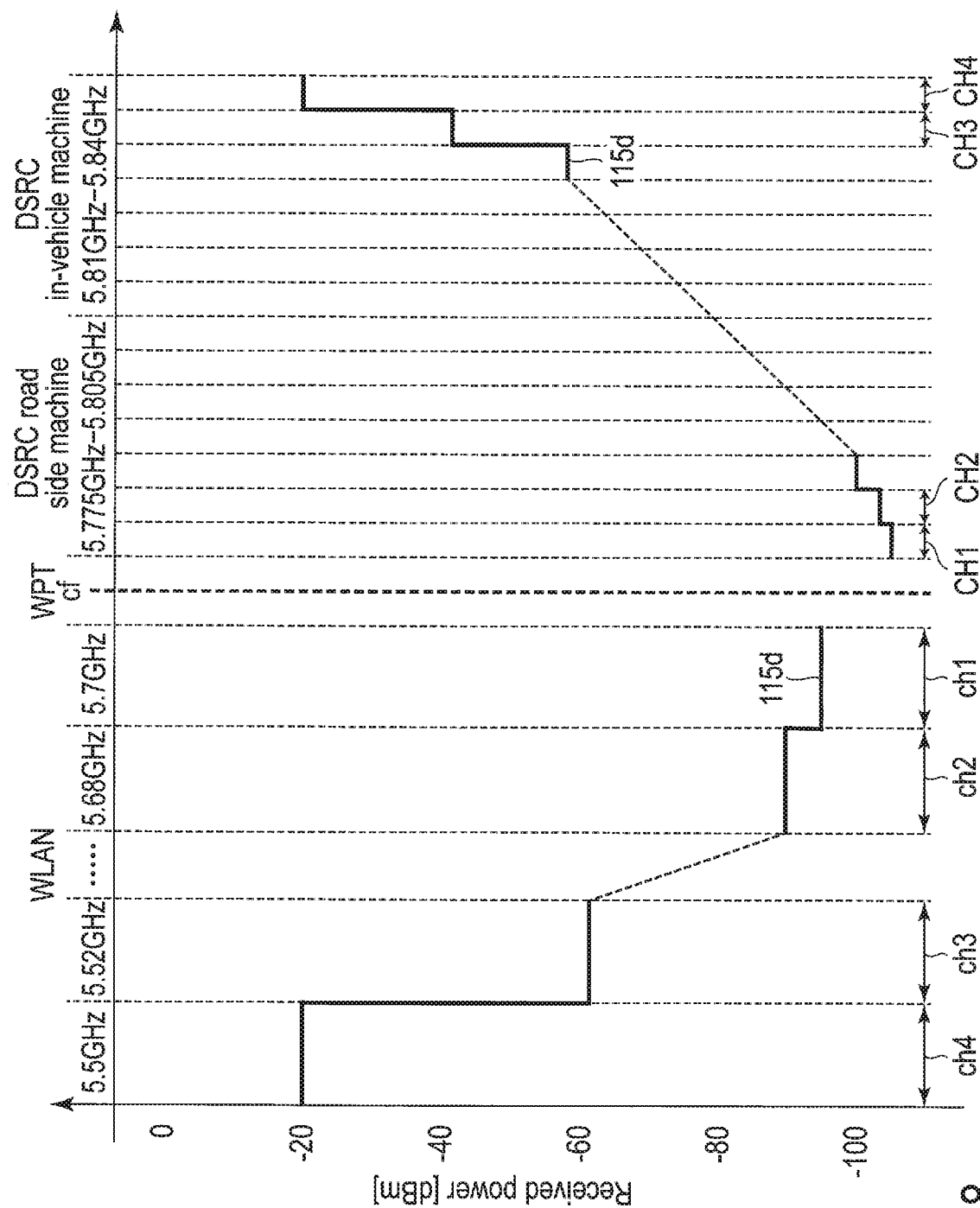
FIG. 8 is another view for describing the first information according to the embodiment.

In the present embodiment, it has been described that the first information drawing the reference lines (the first to the third reference lines 115a to 115c) having the shape illustrated in FIG. 3 is pre-stored in the storage 115, but the present embodiment is not limited thereto. For example, first information drawing a reference line having a shape illustrated in FIG. 8 may also be pre-stored in the storage 115. For convenience of explanation, only a reference line corresponding to one power transmission possible time ratio is illustrated in FIG. 8, but actually, there are a plurality of reference lines corresponding to a plurality of power transmission possible time ratios (that is, a plurality of pieces of first information drawing the same shape as that of the reference line of FIG. 8 are stored in the storage 115). In addition, the reference line of FIG. 8 is a reference line corresponding to the same power transmission possible time ratio as that of the reference line 115c of FIG. 3.

FIG. 8 is a view for describing a reference line 115d having a shape different from that of the reference line illustrated in FIG. 3. As illustrated in FIG. 8, the reference line 115d is the same as the reference line illustrated in FIG. 3 in that in both of frequency bands positioned on a lower frequency side and frequency bands positioned on a higher frequency side than a center frequency cf of a power transmission frequency band, threshold values related to received powers are set to become smaller as frequency bands become closer to the center frequency cf and threshold values related to received powers are set to become larger as frequency bands become more distant from the center frequency cf.

In addition, the reference line 115d is also the same as the reference line illustrated in FIG. 3 in that the threshold values related to the received powers are set to be larger in the frequency bands positioned on the lower frequency side than the center frequency cf of the power transmission frequency band, than in the corresponding frequency bands positioned on the higher frequency side than the center frequency cf. Further, the reference line 115d is also the same as the reference line illustrated in FIG. 3 in that the respective threshold values are set so that a difference between threshold values set in two frequency bands positioned adjacent to each other on the lower frequency side than the center frequency cf of the power transmission frequency band is larger than that between threshold values set in two frequency bands positioned adjacent to each other on the higher frequency side than the center frequency cf. That is, the reference line 115d is the same as the reference line illustrated in FIG. 3 in that the respective threshold values are set to have an asymmetric shape between the lower frequency side and the higher frequency side with respect to the center frequency cf of the power transmission frequency band.

On the other hand, the reference line 115d of FIG. 8 is different from the reference line illustrated in FIG. 3 in that threshold values of the respective frequency bands are set so that the difference between the threshold values set in the two adjacent frequency bands becomes exponentially larger as the frequency bands become more distant from the center frequency cf of the power transmission frequency band. That is, in the reference line illustrated in FIG. 3, the threshold values of the respective frequency bands are set so that the difference between the threshold values set in the two adjacent frequency bands is constant (that is, the threshold values of the respective frequency bands are set to be linearly increased), while in the reference line 115d illustrated in FIG. 8, the threshold values of the respective frequency bands are set to be exponentially increased as the frequency bands become more distant from the center frequency cf of the power transmission frequency band. This is because an electromagnetic wave radiated from the wireless power transmission apparatus 101 is exponentially attenuated as a frequency of the electromagnetic wave becomes more distant from the center frequency cf of the power transmission frequency band.

Therefore, interference with the wireless communication systems that use the frequency bands near the center frequency cf of the power transmission frequency band can be reduced, and for example, when the wireless communication systems use only frequency bands positioned distant from the center frequency cf, the threshold values larger than those of the reference line (reference line 115c) shown in FIG. 3 are set in the frequency bands positioned distant from the center frequency cf, such that an opportunity to perform the wireless power transmission can be increased. That is, power transmission efficiency can be improved.

Here, it is assumed that rates of increase in exponential functions set for the differences between the threshold values of the two adjacent frequency bands on the lower frequency side and the higher frequency side than the center frequency cf of the power transmission frequency band are the same as each other, but the present invention is not limited thereto, and the rates of increase in the exponential functions on the lower frequency side and the higher frequency side may also be different from each other. For example, the rate of increase of the exponential function on the lower frequency side used by the first wireless communication system may be larger than that on the higher frequency side used by the second wireless communication system. This is because it is less likely in the first wireless communication system that a serious problem will occur even though the first wireless communication system is subjected from interference from the wireless power transmission apparatus 101 than in the second wireless communication system, as described above.

In FIG. 8, the frequency band ch1 corresponds to a first frequency band, the frequency band ch2 corresponds to a third frequency band, the frequency band ch3 corresponds to a fifth frequency band, the frequency band CH1 corresponds to a second frequency band, the frequency band CH2 corresponds to a fourth frequency band and the frequency band CH3 corresponds to a sixth frequency band in claims.

Modified Example 2

Figure 9:
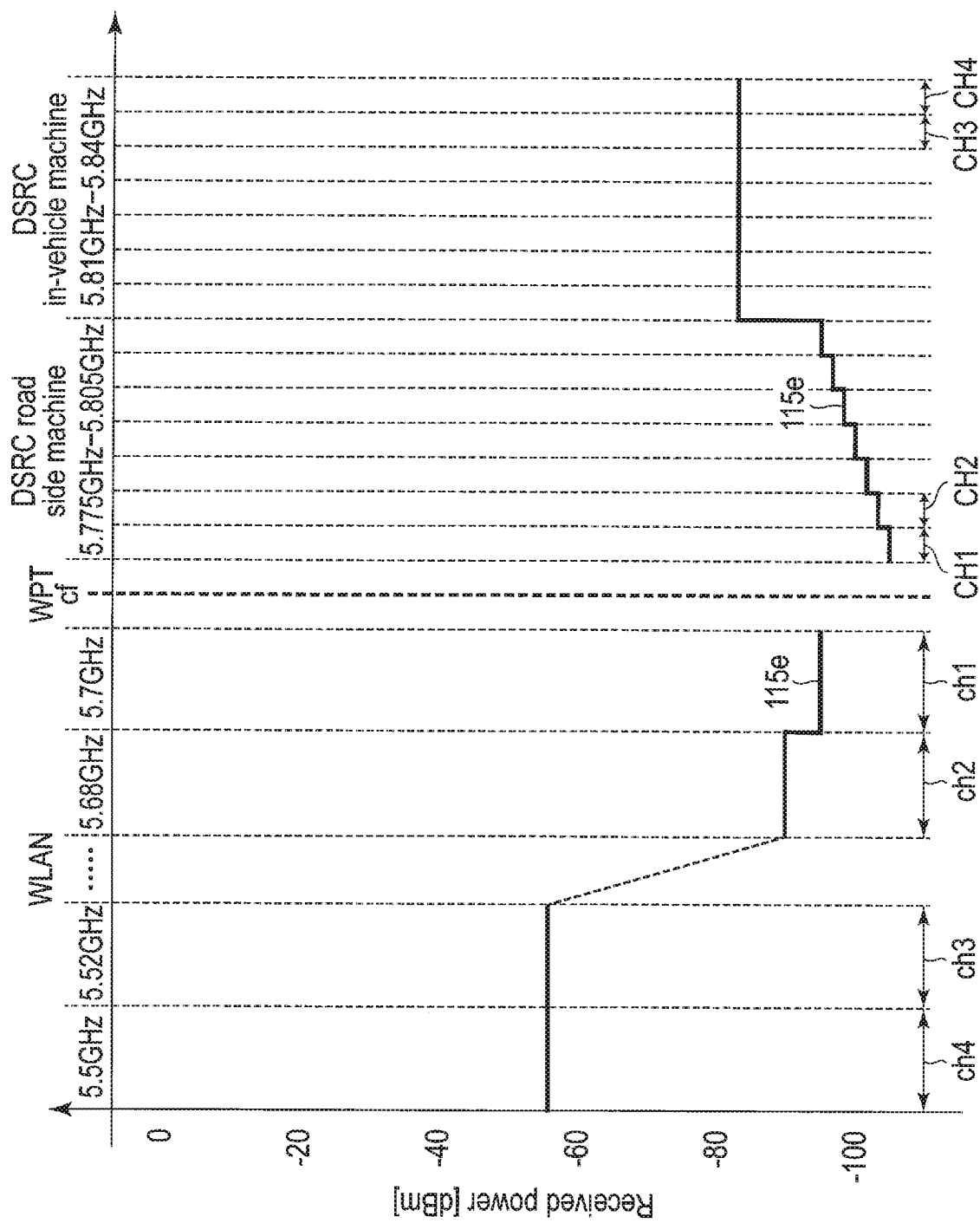
FIG. 9 is yet another view for describing the first information according to the embodiment.

In addition, first information drawing a reference line having a shape shown in FIG. 9 may be pre-stored in the storage 115. For convenience of explanation, only a reference line corresponding to one power transmission possible time ratio is illustrated in FIG. 9, but actually, there are a plurality of reference lines corresponding to a plurality of power transmission possible time ratios (that is, a plurality of pieces of first information drawing the same shape as that of the reference line of FIG. 9 are stored in the storage 115). In addition, the reference line of FIG. 9 is a reference line corresponding to the same power transmission possible time ratio as that of the reference line 115c of FIG. 3.

FIG. 9 is a view for describing a reference line 115e having a shape different from that of the reference line described above. As illustrated in FIG. 9, the reference line 115e is the same as the reference line illustrated described above in that in both of frequency bands positioned on a lower frequency side and frequency bands positioned on a higher frequency side than a center frequency cf of a power transmission frequency band, threshold values related to received powers are set to become smaller as frequency bands become closer to the center frequency cf and threshold values related to received powers are set to become larger as frequency bands become more distant from the center frequency cf.

In addition, the reference line 115e is also the same as the reference lines described above in that the threshold values related to the received powers are set to be larger in the frequency bands positioned on the lower frequency side than the center frequency cf of the power transmission frequency band, than in the corresponding frequency bands positioned on the higher frequency side than the center frequency cf. Further, the reference line 115e is also the same as the reference lines described above in that the respective threshold values are set so that a difference between threshold values set in two frequency bands positioned adjacent to each other on the lower frequency side than the center frequency cf of the power transmission frequency band is larger than that between threshold values set in two frequency bands positioned adjacent to each other on the higher frequency side than the center frequency cf. That is, the reference line 115e is the same as the reference lines described above in that the respective threshold values are set to have an asymmetric shape between the lower frequency side and the higher frequency side with respect to the center frequency cf of the power transmission frequency band.

On the other hand, the reference line 115e of FIG. 9 is different from the reference lines described above in that constant threshold values are set for one or more frequency bands positioned distant from the center frequency cf of the power transmission frequency band by a predetermined frequency or more. That is, in the reference lines described above, different threshold values are set, respectively, in the two frequency bands positioned adjacent to each other, while in the reference line 115e illustrated in FIG. 9, constant threshold values are set with frequency bands distant from the center frequency cf of the power transmission frequency band by a predetermined frequency or more as boundaries. This is because an electromagnetic wave radiated from the wireless power transmission apparatus 101 is attenuated as the electromagnetic wave becomes distant from the center frequency cf of the power transmission frequency band and it is unlikely that a serious problem will occur even though the electromagnetic wave is neglected when a frequency of the electromagnetic wave becomes distant from the center frequency cf by a predetermined frequency or more. It is preferable that the constant threshold values are set to values suitable for frequency bands positioned most distant from the center frequency cf on both of the lower frequency side and the higher frequency side than the center frequency cf of the power transmission frequency band.

Therefore, the same effect as that of the reference line 115*d* shown in FIG. 8 can be obtained.

The frequency bands positioned distant from the center frequency cf of the power transmission frequency band by a predetermined frequency are frequency bands that are hardly subjected from interference from the wireless power transmission apparatus 101, and may be determined based on a maximum value of a transmitting power of the wireless power transmission apparatus 101 or may be determined based on receiving filters set in the wireless communication apparatuses included in the first and second wireless communication systems, for example.

In FIG. 9, the frequency band ch1 corresponds to a first frequency band, the frequency band ch2 corresponds to a third frequency band, the frequency band ch3 corresponds to a seventh frequency band, the frequency bands ch4 corresponds to at least one eighth frequency band, the frequency band CH1 corresponds to a second frequency band, the frequency band CH2 corresponds to a fourth frequency band, the frequency band CH3 corresponds to a ninth frequency band and the frequency band CH4 corresponds to at least one tenth frequency band in claims.

Modified Example 3

Further, first information drawing a reference line having a shape shown in FIG. 10 may be pre-stored in the storage 115. For convenience of explanation, only a reference line corresponding to one power transmission possible time ratio is illustrated in FIG. 10, but actually, there are a plurality of reference lines corresponding to a plurality of power transmission possible time ratios (that is, a plurality of pieces of first information drawing the same shape as that of the reference line of FIG. 10 are stored in the storage 115).

FIG. 10 is a view for describing a reference line 115*f* having a shape different from those of the reference lines described above. The reference line 115*f* of FIG. 10 is different from the reference lines described above in that a plurality of frequency bands are grouped as one group and threshold values related to received powers are set for each group.

Also in this case, similarly to the reference lines described above, threshold values related to received powers are set to become smaller as the group become closer to a center frequency cf of a power transmission frequency band and are set to become larger as the group becomes distant from the center frequency cf.

In addition, the threshold values related to the received powers are set to be larger in groups positioned on a lower frequency side than the center frequency cf of the power transmission frequency band, than in corresponding groups positioned on a higher frequency side than the center frequency cf. Further, the respective threshold values are set so that a difference between threshold values set in two groups positioned adjacent to each other on the lower frequency side than the center frequency cf of the power transmission frequency band is larger than that between threshold values set in two groups positioned adjacent to each other on the higher frequency side than the center frequency cf. That is, the respective threshold values are set to have an asymmetric shape between the lower frequency side and the higher frequency side with respect to the center frequency cf of the power transmission frequency band.

The groups described above may be determined based on bandwidths of channels actually used by the first and second wireless communication systems or may be determined based on a type of equipment of the wireless communication apparatuses included in the first and second wireless communication systems, for example.

For example, frequency bands on a second wireless communication system side (that is, frequency bands on the higher frequency side) may be grouped by setting a plurality of frequency bands used by DSRC road side machine to a first group (road side machine channel) and setting a plurality of frequency bands used by DSRC in-vehicle machines to a second group (in-vehicle apparatus channel).

Therefore, when the first and second wireless communication systems use a plurality of frequency bands as one channel or when the type of equipment of the wireless communication apparatuses included in the first and second wireless communication systems are limited, it becomes possible to set appropriate threshold values in a group unit.

In FIG. 10, the frequency band ch1 corresponds to a first frequency band, the frequency band ch2 corresponds to a third frequency band, the frequency band which is adjacent to the frequency band ch2 and is included in the same channel bandwidth as a channel bandwidth in which the frequency band ch2 is included (not shown) corresponds to an eleventh frequency band, the frequency band CH1 corresponds to a second frequency band, the frequency band CH2 corresponds to a fourth frequency band, the frequency band which is adjacent to the frequency band CH2 and is included in the same channel bandwidth as a channel bandwidth in which the frequency band CH2 is included (not shown) corresponds to a twelfth frequency band in claims.

The shapes of the reference lines illustrated in Modified Examples 1 to 3 described above may be arbitrarily combined with each other and be used. For example, on the lower frequency side than the center frequency cf of the power transmission frequency band, the respective threshold value may be set so that the shape of the reference line is the shape illustrated in Modified Example 1 described above and on the higher frequency side than the center frequency cf, the respective threshold value may be set so that the shape of the reference line is the shape illustrated in Modified Example 2 described above.

Modified Example 4

Figure 11:
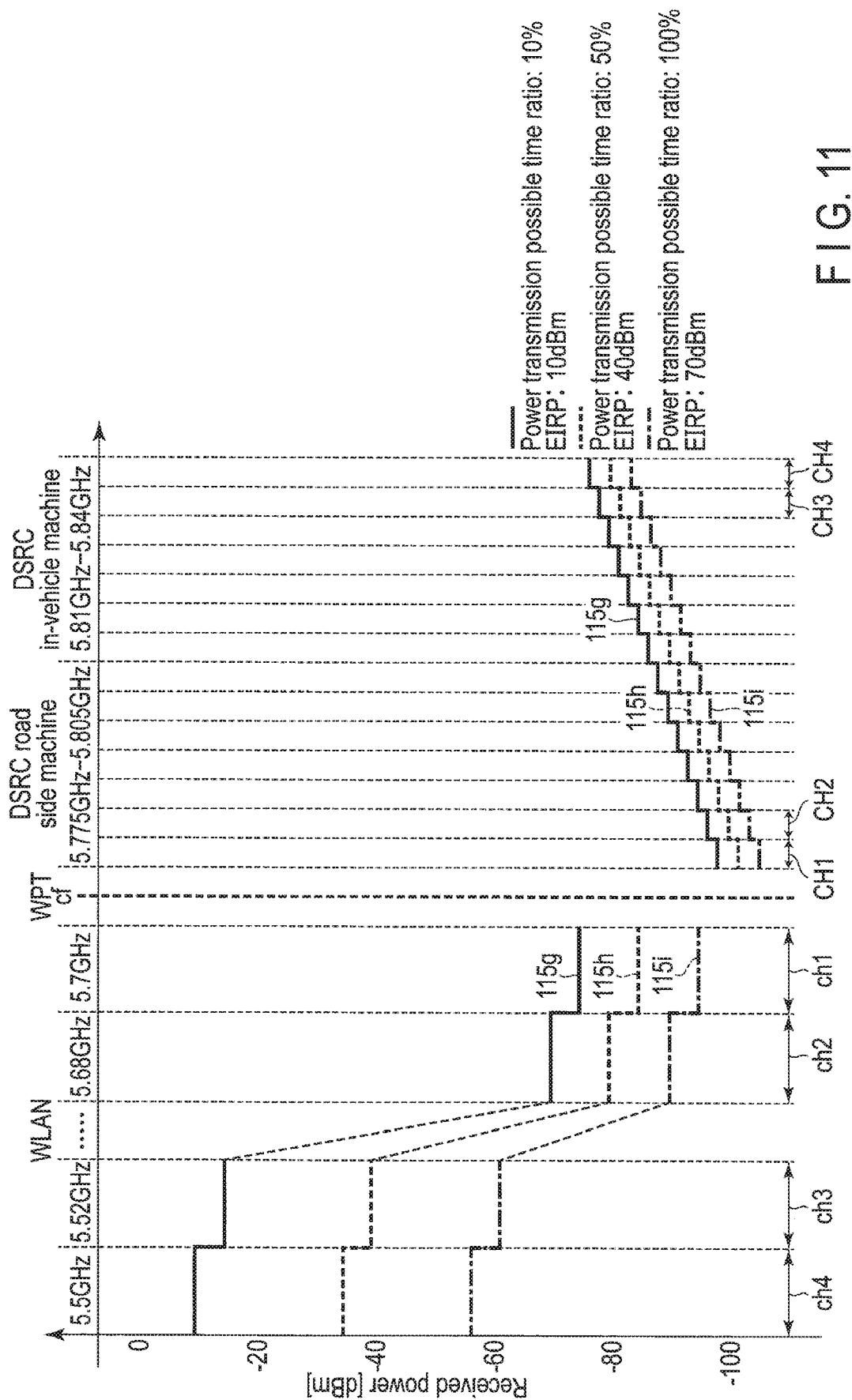
FIG. 11 is yet another view for describing the first information according to the embodiment.

It has been described that the first information pre-stored in the storage 115 is the information associating the threshold values related to the received powers and the power transmission possible time ratios with each other, but the present embodiment is not limited thereto, and the first information may also be information associating the threshold values related to the received powers, the power transmission possible time ratios, and maximum equivalent isotropic radiated powers (EIRPs) with one another as illustrated in FIG. 11. The maximum equivalent isotropic radiated power is used to determine the transmitting power described above. Here, a case where the transmitting power is determined based on the maximum equivalent isotropic radiated power is described, but the transmitting power may also be determined by another method.

A reference line 115*g* represented by a solid line in FIG. 11 shows threshold values for each frequency band corresponding to a case where a time (power transmission possible time) during which an electromagnetic wave can be radiated to the wireless power receiver 102 with a maximum equivalent isotropic radiated power of 10 dBm is 10% of the maximum power transmission time. Likewise, a reference line 115*h* represented by a dotted line in FIG. 11 shows threshold values for each frequency band corresponding to a case where a time during which an electromagnetic wave can be radiated to the wireless power receiver 102 with a maximum equivalent isotropic radiated power of 40 dBm is 50% of the maximum power transmission time. Further, a reference line 115*i* represented by an alternate long and short dash line in FIG. 11 shows threshold values for each frequency band corresponding to a case where a time during which an electromagnetic wave can be radiated to the wireless power receiver 102 with a maximum equivalent isotropic radiated power of 70 dBm is 100% of the maximum power transmission time.

The reference lines 115*g* to 115*i* of FIG. 11 have the same shapes as those of the reference lines 115*a* to 115*c* of FIG. 3, respectively, and the respective threshold values related to the received powers are set to have these shapes. In addition, the threshold values related to the received powers are set to become larger as both of the maximum equivalent isotropic radiated power and the power transmission possible time ratio become smaller and are set to become smaller as both of the maximum equivalent isotropic radiated power and the power transmission possible time ratio become larger, as shown by the reference lines 115*g* to 115*i* of FIG. 11.

The first information illustrated in FIG. 11 is pre-stored in the storage 115, such that the controller 116 can determine the maximum equivalent isotropic radiated power and the power transmission possible time ratio based on the received power detected for each frequency band by the power detector 114 with the first information pre-stored in the storage 115 and illustrated in FIG. 11. Therefore, the controller 116 can determine the power transmission timing depending on the determined power transmission possible time ratio and determine the transmitting power depending on the determined maximum equivalent isotropic radiated power.

That is, even when the transmitting power at the time of performing the wireless power transmission is not constant, it is possible to determine the power transmission timing (power transmission possible time ratio) and the transmitting power (maximum equivalent isotropic radiated power) without generating serious interference with the first and second wireless communication systems, based on the received power detected in each frequency band.

As illustrated in FIG. 11, the first information defines a plurality of parameters, such that the controller 116 may perform the following control. For example, when the reference line 115*g* is selected based on a detection result by the power detector 114, the controller 116 normally controls the wireless power transmitter 113 to perform the wireless power transmission during only 10% of the maximum power transmission time with a transmitting power of 10 dBm. However, the controller 116 may also control the wireless power transmitter 113 to perform the wireless power transmission by decreasing one of the transmitting power (maximum equivalent isotropic radiated power) and the power transmission timing (power transmission possible time ratio) and increasing the other of the transmitting power and the power transmission timing. That is, the controller 116 may control the wireless power transmitter 113 to perform the wireless power transmission during only 20% of the maximum power transmission time with a transmitting power of 5 dBm.

In addition, here, a case where the first information defines the maximum equivalent isotropic radiated power as well as the power transmission possible time ratio has been described by way of example, but the present invention is not limited thereto. For example, the first information may also define only the maximum equivalent isotropic radiated power.

Alternatively, the first information may define a continuous power transmission period in which the wireless power transmission to the wireless power receiver 102 can be continuously performed instead of the power transmission possible time ratio or the maximum equivalent isotropic radiated power. In this case, the threshold values related to the received powers are set to become smaller as the continuous transmission period becomes longer and are set to become larger as the continuous transmission period becomes shorter.

Further, the first information may define an interval of a scan period for the power detector 114 to detect the received power from each frequency band instead of the power transmission possible time ratio or the maximum equivalent isotropic radiated power. In this case, the threshold values related to the received powers are set to become smaller as the scan period becomes longer and are set to become larger as the scan period becomes shorter.

That is, the first information may be information associating the threshold values for the received powers for each frequency band used by the first and second wireless communication systems and particulars (for example, the power transmission possible time ratio, the maximum equivalent isotropic radiated power, the continuous power transmission period, and the scan period) related to the wireless power transmission with each other.

Modified Example 5

Figure 12:
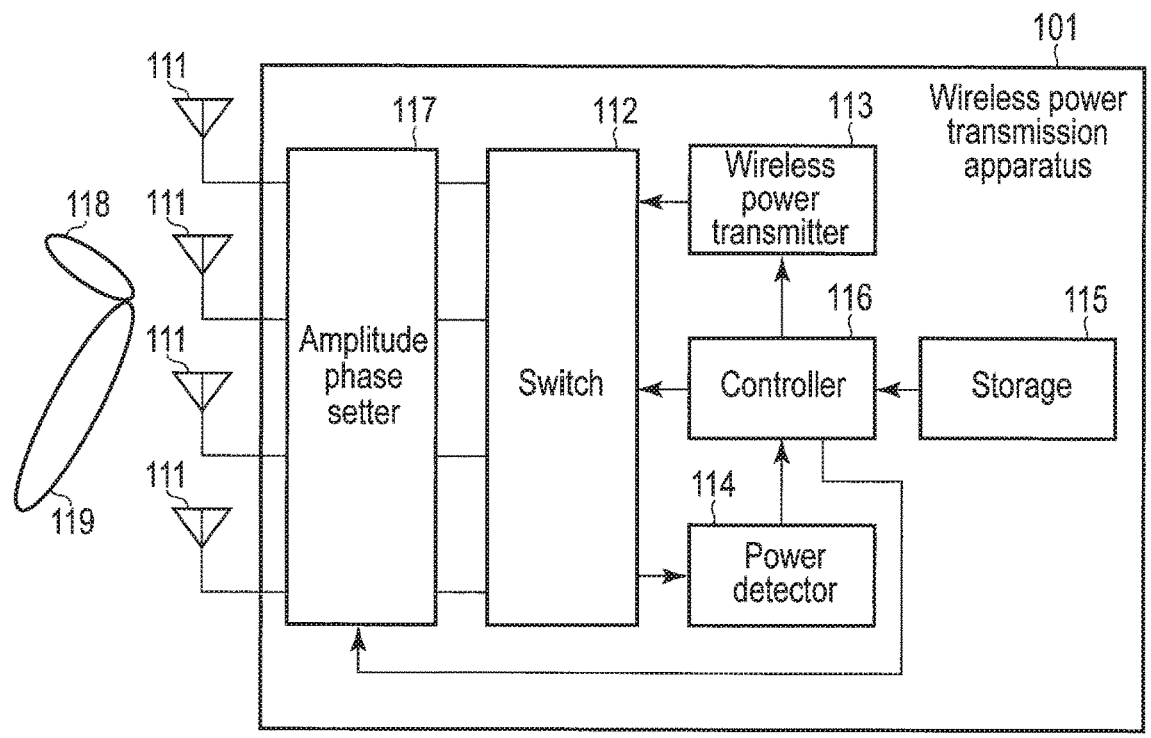
FIG. 12 is another view illustrating an example of a hardware configuration of a wireless power transmission apparatus according to the embodiment.

FIG. 12 illustrates an example of a hardware configuration of a wireless power transmission apparatus 101 according to the present modified example. The wireless power transmission apparatus 101 illustrated in FIG. 12 is different from the wireless power transmission apparatus 101 illustrated in FIG. 2 in that an antenna 111 is an array antenna including a plurality of element antennas and the wireless power transmission apparatus 101 illustrated in FIG. 12 further includes an amplitude phase setter 117. Here, it is assumed that the first information illustrated in FIG. 11 is pre-stored in the storage 115.

The amplitude phase setter 117 independently controls amplitudes and phases of excitation of the respective element antennas according to an instruction from a controller 116. Therefore, it is possible to form a beam pattern directed toward a predetermined direction within a range of 0° to 180° with respect to an installation surface of the antenna 111. That is, a sharp directivity can be given to the direction toward which the beam pattern is directed. Here, it is assumed that the amplitude phase setter 117 controls the amplitudes and the phases of the excitation of the respective element antennas, thereby forming two types of beam patterns such as beam patterns 118 and 119. However, the number of beam patterns that are formed is not limited to thereto.

A power detector 114 detects the received powers for each frequency band used in the first and second wireless communication systems for each scan period, as described above. However, here, the power detector 114 performs a process of detecting the received powers for each frequency band after the beam pattern 118 is formed and a process of detecting the received power for each frequency band after the beam pattern 119 is formed, for each scan period. That is, the power detector 114 detects the received powers for each frequency band used in the first and second wireless communication systems for each beam pattern.

The controller 116 determines a maximum equivalent isotropic radiated power and a power transmission possible time ratio based on the received powers for each frequency band detected with the beam pattern 118 and the first information pre-stored in the storage 115. Likewise, the controller 116 determines a maximum equivalent isotropic radiated power and a power transmission possible time ratio based on the received powers for each frequency band detected with the beam pattern 119 and the first information pre-stored in the storage 115. Information indicating the maximum equivalent isotropic radiated powers and the power transmission possible time ratios determined for each beam pattern may be stored in the storage 115.

When the controller 116 recognizes a beam pattern to be used at the time of the wireless power transmission, the controller 116 controls the wireless power transmitter 113 to perform the wireless power transmission based on a maximum equivalent isotropic radiated power and a power transmission possible time ratio corresponding to the recognized beam pattern. The controller 116 enables the recognition of the beam pattern to be used at the time of the wireless power transmission by grasping a direction in which the wireless power receiver 102 is installed, in advance, and also controls the amplitude phase setter 117 to form a beam pattern directed toward the direction, at the time of the wireless power transmission.

Therefore, it is possible to improve power transmission efficiency to the wireless power receiver 102 installed in the direction toward which the beam pattern is directed. In addition, since it is also possible to reduce radiation of an electromagnetic wave to a direction toward which the beam pattern is not directed, it is also possible to suppress interference with the first and second wireless communication systems.

Modified Example 6

Figure 13:
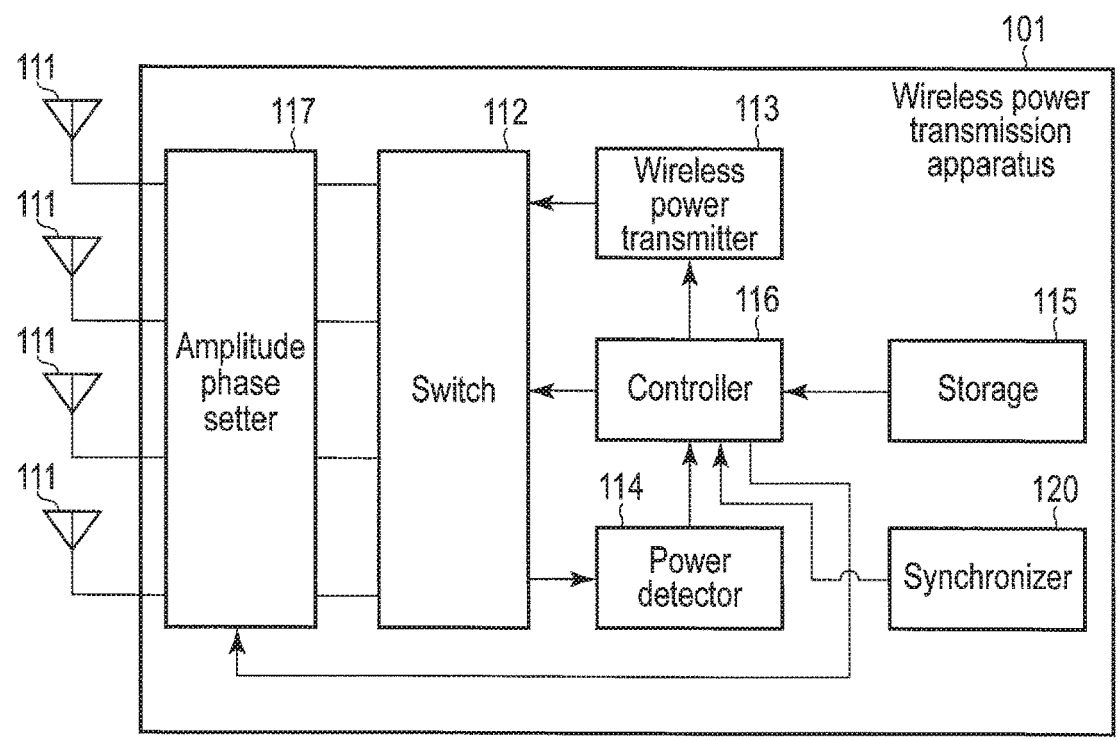
FIG. 13 is yet another view illustrating an example of a hardware configuration of a wireless power transmission apparatus according to the embodiment.

FIG. 13 illustrates an example of a hardware configuration of a wireless power transmission apparatus 101 according to the present modified example. The wireless power transmission apparatus 101 illustrated in FIG. 13 differs from the wireless power transmission apparatus 101 illustrated in FIG. 12 in that it further includes a synchronizer 120. In addition, in the present modified example, a wireless power transmission environment in which a plurality of wireless power transmission apparatuses 101 are installed close to each other is assumed.

In a case where the plurality of wireless power transmission apparatuses 101 are installed close to each other and timings at which the respective wireless power transmission apparatuses 101 detect received powers in frequency bands used in the first and second wireless communication systems are different from each other, it is likely that the other wireless power transmission apparatuses 101 will perform wireless power transmission when the wireless power transmission apparatus 101 detects the received power. In this case, the wireless power transmission apparatus 101 erroneously detects electromagnetic waves radiated from the other wireless power transmission apparatuses 101, such that it is likely that the wireless power transmission apparatus 101 cannot detect an accurate received power.

For this reason, the wireless power transmission apparatus 101 according to the present modified example synchronizes a timing at which the detection of the received power is started and a scan period for the detection with each other between the plurality of wireless power transmission apparatuses 101 using the synchronizer 120. It is assumed that the plurality of wireless power transmission apparatuses 101 are communicably connected to each other and one of the plurality of wireless power transmission apparatuses 101 functions as a host.

A synchronizer 120 of the wireless power transmission apparatus 101 functioning as the host transmits synchronization information indicating the timing at which the detection of the received power is started and the scan period for the detection to the other wireless power transmission apparatuses 101 to which the wireless power transmission apparatus 101 is communicably connected. When a synchronizer 120 of each of the other wireless power transmission apparatus 101 receives the synchronization information transmitted from the wireless power transmission apparatus 101 functioning as the host, the synchronizer 120 supplies the synchronization information to a controller 116.

A controller 116 of the wireless power transmission apparatus 101 functioning as the host controls a switch 112 to switch an operation mode of an antenna 111 into an operation mode in which the antenna 111 functions as a receiving antenna when the timing, at which the detection of the received power is started, is reached with reference to setting of the host apparatus. Likewise, the controller 116 of each of the other wireless power transmission apparatuses 101 controls switches 112 to switch an operation mode of antenna 111 into an operation mode in which the antenna 111 functions as a receiving antenna when the timing, at which the detection of the received power is started, indicated by the synchronization information supplied through the synchronizer 120, is reached.

The controller of the wireless power transmission apparatus 101 functioning as the host controls the switch 112 to switch the operation mode of the antenna 111 into an operation mode in which the antenna 111 functions as a transmitting antenna when it detects that the scan period has elapsed since the detection of the received power was started with reference to the setting of the host apparatus, and performs wireless power transmission to the corresponding wireless receiver 102. The controller 116 of each of the other wireless power transmission apparatuses 101 controls the switch 112 to switch the operation mode of the antenna 111 into an operation mode in which the antenna 111 functions as a transmitting antenna when it detects that the scan period has elapsed since the detection of the received power was started with reference to the synchronization information supplied through the synchronizer 120, and performs wireless power transmission to the corresponding wireless receiver 102.

Figure 14:
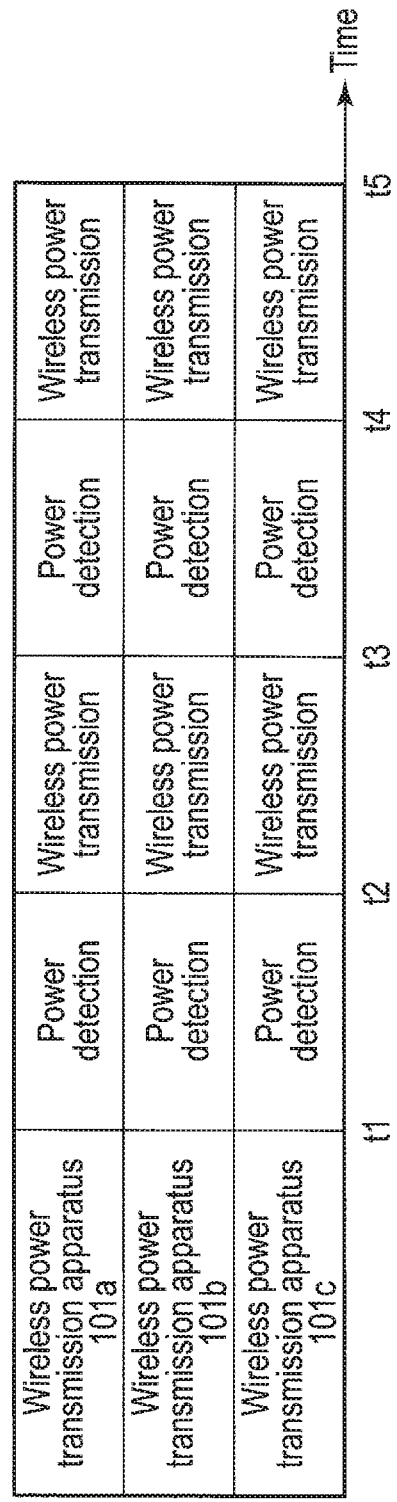
FIG. 14 is yet another view for complementarily describing the operations of the wireless power transmission apparatus according to the embodiment.

Therefore, as illustrated in FIG. 14, it is possible to synchronize the scan period for performing the detection of the received power and a period for performing the wireless power transmission to the wireless power receiver 102 with each other among the respective wireless power transmission apparatuses 101a to 101c, and it is thus possible to prevent the electromagnetic waves radiated from the other wireless power transmission apparatuses 101 different from the host apparatus from being erroneously detected as received powers.

The synchronization information may further include information indicating a beam pattern that is used, in addition to the timing at which the detection of the received power is started and the scan period for the detection. In this case, the other wireless power transmission apparatuses 101 perform detection of received powers and wireless power transmission to the wireless power receiver 102 using beam patterns different from the beam pattern indicated by the synchronization information supplied through the synchronizer 120. Therefore, the wireless power transmission apparatus 101 can perform detection of a received power and wireless power transmission to the wireless power receiver 102 using the beam pattern different from those of the other wireless power transmission apparatuses 101, and it is thus possible to more certainly prevent the other wireless power transmission apparatuses 101 from interfering with the wireless power transmission apparatus 101.

A case where the controller 116 determines the power transmission possible time ratio in which the wireless power transmission can be performed, that is, a case where the controller 116 controls the power transmission possible time has been mainly described in the present embodiment, but the present embodiment is not limited thereto. The controller 116 may control a magnitude of a power that can be transmitted rather than the power transmission possible time. In this case, the controller 116 may perform control using the first information in which the magnitude of the power that can be transmitted is defined, instead of the power transmission possible time.

Alternatively, the controller 116 may control both of the power transmission possible time and the magnitude of the power that can be transmitted. In this case, the controller 116 may perform control using the first information in which both of the power transmission possible time and the magnitude of the power that can be transmitted are defined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a power transmitter configured to transmit a power by an electromagnetic wave of a power transmission frequency band according to a power transmission period;
    detect circuitry configured to detect a power in a frequency band different from the power transmission frequency band; and
    control circuitry configured to determine the power transmission period based on a first threshold value set for a power detected in a first frequency band, a second threshold value set for a power detected in a second frequency band, a third threshold value set for a power detected in a third frequency band, and a fourth threshold value set for a power detected in a fourth frequency band, wherein
        the first frequency band includes a lower frequency than a center frequency of the power transmission frequency band,
        the second frequency band includes a higher frequency than the center frequency,
        the third frequency band is adjacent to the first frequency band and includes a lower frequency than the first frequency band,
        the fourth frequency band is adjacent to the second frequency band and includes a higher frequency than the second frequency band,
        the third threshold value is larger than the first threshold value,
        the fourth threshold value is larger than the second threshold value, and
        a difference between the third threshold value and the first threshold value is larger than that between the fourth threshold value and the second threshold value.

2. The electronic apparatus of claim 1,
    wherein the control circuitry is configured to determine the power transmission period based on the first to fourth threshold values, a fifth threshold value set for a power detected in a fifth frequency band, and a sixth threshold value set for a power detected in a sixth frequency band, wherein
        the fifth frequency band is adjacent to the third frequency band and includes a lower frequency than the third frequency band,
        the sixth frequency band is adjacent to the fourth frequency band and includes a higher frequency than the fourth frequency band,
        a difference between the fifth threshold value and the third threshold value is larger than that between the third threshold value and the first threshold value, and
        a difference between the sixth threshold value and the fourth threshold value is larger than that between the fourth threshold value and the second threshold value.

3. The electronic apparatus of claim 1,
    wherein the control circuitry is configured to determine the power transmission period based on the first to fourth threshold values, a seventh threshold value set for a power detected in a seventh frequency band, an eighth threshold value set for a power detected in at least one eighth frequency band, a ninth threshold value set for a power detected in a ninth frequency band, and a tenth threshold value set for a power detected in at least one tenth frequency band, wherein
        the seventh frequency band is distant from the first frequency band by a first value or more and includes a lower frequency than the first frequency band,
        the at least one eighth frequency band includes a lower frequency than the seventh frequency band,
        the ninth frequency band is distant from the second frequency by a second value or more and includes a higher frequency than the second frequency band,
        the at least one tenth frequency band includes a higher frequency than the ninth frequency band,
    the seventh threshold value and the eighth threshold value are the same as each other, and
    the ninth threshold value and the tenth threshold value are the same as each other.

4. The electronic apparatus of claim 1,
    wherein the control circuitry is configured to determine the power transmission period based on the first to fourth threshold values, an eleventh threshold value set for a power detected in an eleventh frequency band, and a twelfth threshold value set for a power detected in a twelfth frequency band, wherein
        the eleventh frequency band is adjacent to the third frequency band and includes a lower frequency than the third frequency band, and is included in the same channel bandwidth as a channel bandwidth in which the third frequency band is included,
        the twelfth frequency band is adjacent to the fourth frequency band and includes a higher frequency than the fourth frequency band, and is used in the same type of equipment as equipment that uses the fourth frequency band, the third threshold value and the eleventh threshold value are the same as each other, and the fourth threshold value and the twelfth threshold value are the same as each other.

5. The electronic apparatus of claim 1,
wherein the control circuitry is configured to determine the power transmission period and a transmission power, based on the first to fourth threshold values and information on the transmission power.

6. The electronic apparatus of claim 5,
wherein the detect circuitry is configured to:
  detect a power in a frequency band different from the power transmission frequency band with a directivity in a first direction, and
  detect a power in a frequency band different from the power transmission frequency band with a directivity in a second direction different from the first direction, and
wherein the control circuitry is configured to:
  determine the power transmission period and the transmission power, based on the first to fourth threshold values, the power in the frequency band detected with the directivity in the first direction, and the information on the transmission power, in a case of having the directivity in the first direction, and
  determine the power transmission period and the transmission power, based on the first to fourth threshold values, the power in the frequency band detected with the directivity in the second direction, and the information on the transmission power, in a case of having the directivity in the second direction.

7. The electronic apparatus of claim 6, further comprising a synchro circuitry configured to synchronize a timing of detecting the power in the frequency band different from the power transmission frequency band and a timing of transmitting power with another electronic apparatus positioned in the vicinity of the electronic apparatus.

8. The electronic apparatus of claim 7,
wherein the detect circuitry is configured to detect the power in the frequency band different from the power transmission frequency band with a directivity in a direction different from the another electronic apparatus.

9. A method comprising:
transmitting a power by an electromagnetic wave of a power transmission frequency band according to a power transmission period;
detecting a power in a frequency band different from the power transmission frequency band;
determining the power transmission period based on a first threshold value set for a power detected in a first frequency band, a second threshold value set for a power detected in a second frequency, a third threshold value set for a power detected in a third frequency, a fourth threshold value set for a power detected in a fourth frequency, wherein
  the first frequency band includes a lower frequency than a center frequency of the power transmission frequency band,
  the second frequency band includes a higher frequency than the center frequency,
  the third frequency band is adjacent to the first frequency band and includes a lower frequency than the first frequency band,
  the fourth frequency band is adjacent to the second frequency band and includes a higher frequency than the second frequency band, the third threshold value is larger than the first threshold value,
the fourth threshold value is larger than the second threshold value, and
a difference between the third threshold value and the first threshold value is larger than that between the fourth threshold value and the second threshold value.

10. The method of claim 9, further comprising
determining the power transmission period based on the first to fourth threshold values, a fifth threshold value set for a power detected in a fifth frequency band, and a sixth threshold value set for a power detected in a sixth frequency band, wherein
  the fifth frequency band is adjacent to the third frequency band and includes a lower frequency than the third frequency band,
  the sixth frequency band is adjacent to the fourth frequency band and includes a higher frequency than the fourth frequency band,
a difference between the fifth threshold value and the third threshold value is larger than that between the third threshold value and the first threshold value, and
a difference between the sixth threshold value and the fourth threshold value is larger than that between the fourth threshold value and the second threshold value.

11. The method of claim 9, further comprising
determining the power transmission period based on the first to fourth threshold values, a seventh threshold value set for a power detected in a seventh frequency band, an eighth threshold value set for a power detected in at least one eighth frequency band, a ninth threshold value set for a power detected in a ninth frequency band, and a tenth threshold value set for a power detected in at least one tenth frequency band, wherein
  the seventh frequency band is distant from the first frequency band by a first value or more and includes a lower frequency than the first frequency band,
  the at least one eighth frequency band includes a lower frequency than the seventh frequency band,
  the ninth frequency band is distant from the second frequency by a second value or more and includes a higher frequency than the second frequency band,
  the at least one tenth frequency band includes a higher frequency than the ninth frequency band,
the seventh threshold value and the eighth threshold value are the same as each other, and
the ninth threshold value and the tenth threshold value are the same as each other.

12. The method of claim 9, further comprising
determining the power transmission period based on the first to fourth threshold values, an eleventh threshold value set for a power detected in an eleventh frequency band, and a twelfth threshold value set for a power detected in a twelfth frequency band, wherein
  the eleventh frequency band is adjacent to the fourth frequency band and includes a lower frequency than the third frequency band, and is included in the same channel bandwidth as a channel bandwidth in which the third frequency band is included,
  the twelfth frequency band is adjacent to the fourth frequency band and includes a higher frequency than the fourth frequency band, and is used in the same type of equipment as equipment that uses the fourth frequency band,
the third threshold value and the eleventh threshold value are the same as each other, and the fourth threshold value and the twelfth threshold value are the same as each other.

13. The method of claim 9, further comprising
determining the power transmission period and a transmission power based on the first to fourth threshold values and information on the transmission power.

14. The method of claim 13, further comprising
detecting a power in a frequency band different from the power transmission frequency band with a directivity in a first direction,
detecting a power in a frequency band different from the power transmission frequency band with a directivity in a second direction different from the first direction,
determining the power transmission period and the transmission power, based on the first to fourth threshold values, the power in the frequency band detected with the directivity in the first direction, and the information on the transmission power, in a case of having the directivity in the first direction; and
determining the power transmission period and the transmission power, based on the first to fourth threshold values, the power in the frequency band detected with the directivity in the second direction, and the information on the transmission power, in a case of having the directivity in the second direction.

15. The method of claim 14, further comprising
synchronizing a timing of detecting the power in the frequency band different from the power transmission frequency band and a timing of transmitting power with another electronic apparatus positioned in the vicinity of an electronic apparatus.

16. The method of claim 15, further comprising
detecting the power in the frequency band different from the power transmission frequency band with a directivity in a direction different from the another electronic apparatus.

17. A method comprising:
transmitting a power by an electromagnetic wave of a power transmission frequency band according to a power transmission period;
detecting a power in a frequency band different from the power transmission frequency band; and
determining a transmission power based on a first threshold value set for a power detected in a first frequency band, a second threshold value set for a power detected in a second frequency band, a third threshold value set for a power detected in a third frequency band, a fourth threshold value set for a power detected in a fourth frequency band, wherein
the first frequency band includes a lower frequency than a center frequency of the power transmission frequency band,
the second frequency band includes a higher frequency than the center frequency,
the third frequency band is adjacent to the first frequency band and includes a lower frequency than the first frequency band,
the fourth frequency band is adjacent to the second frequency band and includes a higher frequency than the second frequency band,
the third threshold value is larger than the first threshold value,
the fourth threshold value is larger than the second threshold value, and
a difference between the third threshold value and the first threshold value is larger than that between the fourth threshold value and the second threshold value.

* * * * *